(12) United States Patent
Maegawa et al.

(10) Patent No.: US 8,378,779 B2
(45) Date of Patent: Feb. 19, 2013

(54) FACILITY EQUIPMENT COOPERATION SYSTEM, EQUIPMENT CONTROL METHOD, AND AGENT APPARATUS

(75) Inventors: Tomonori Maegawa, Tokyo (JP); Yu Kaneko, Yokohama (JP); Yusuke Doi, Yokohama (JP); Masahiro Ishiyama, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 679 days.

(21) Appl. No.: 12/403,174

(22) Filed: Mar. 12, 2009

(65) Prior Publication Data

US 2009/0231092 A1 Sep. 17, 2009

(30) Foreign Application Priority Data

Mar. 13, 2008 (JP) ................... 2008-064234

(51) Int. Cl.
*G05B 23/02* (2006.01)
*G05B 15/02* (2006.01)
*G05B 15/00* (2006.01)
*G06F 17/00* (2006.01)

(52) U.S. Cl. ............. 340/3.1; 340/531; 340/540; 700/9; 700/10; 700/75; 700/76; 700/241

(58) Field of Classification Search .................. None
See application file for complete search history.

(56) References Cited

U.S. PATENT DOCUMENTS

| 4,918,588 A * | 4/1990 | Barrett et al. ............................ 1/1 |
| 6,021,496 A * | 2/2000 | Dutcher et al. ................. 726/21 |
| 6,437,692 B1 * | 8/2002 | Petite et al. ................... 340/540 |
| 6,598,056 B1 * | 7/2003 | Hull et al. ............................ 1/1 |
| 6,640,145 B2 * | 10/2003 | Hoffberg et al. ................. 700/83 |
| 6,687,487 B1 * | 2/2004 | Mosebrook et al. ......... 455/11.1 |

(Continued)

FOREIGN PATENT DOCUMENTS

| JP | 2-69096 A | 3/1990 |
| JP | 8-96970 A | 4/1996 |

(Continued)

OTHER PUBLICATIONS

Kyun Chang Lee, Network-based Fire-Detection System via Controller Area Network for Smart Home Automation, Nov. 2004, IEEE consumer Electronics Society, pertinent pages.*

(Continued)

*Primary Examiner* — Daniel Wu
*Assistant Examiner* — Muhammad Adnan
(74) *Attorney, Agent, or Firm* — Ohlandt, Greeley, Ruggiero, and Perle, L.L.P.

(57) ABSTRACT

An apparatus communicating with a gateway apparatus on a control system network for facility equipment, via an information system network, includes a unit which stores not less than one piece of virtual point information defining a virtual point combined with not less than one piece of facility equipment, a user authentication unit which performs user authentication for a user associated with a client, a unit which receives a request for control on one virtual point from the client, a unit which creates a remote control command for the facility equipment associated with the request based on the virtual point information when the request has been received and the user authentication has succeeded, and a unit which transmit the remote control command to the gateway via the information system network when tenant authentication for a tenant associated with the agent apparatus which is performed by the gateway has succeeded.

19 Claims, 13 Drawing Sheets

U.S. PATENT DOCUMENTS

| | | | |
|---|---|---|---|
| 6,865,427 B2 * | 3/2005 | Brown et al. | 700/19 |
| 6,975,220 B1 * | 12/2005 | Foodman et al. | 340/531 |
| 7,110,919 B2 * | 9/2006 | Brindac et al. | 702/188 |
| 7,222,241 B2 * | 5/2007 | Milgramm et al. | 713/186 |
| 7,269,463 B2 * | 9/2007 | Nagatsuka et al. | 700/17 |
| 7,360,163 B2 * | 4/2008 | Masuda | 715/748 |
| 7,397,363 B2 * | 7/2008 | Joao | 340/539.11 |
| 7,428,698 B2 * | 9/2008 | Bodin et al. | 715/234 |
| 7,639,157 B1 * | 12/2009 | Whitley et al. | 340/870.02 |
| 7,847,675 B1 * | 12/2010 | Thyen et al. | 340/5.2 |
| 2002/0026533 A1 * | 2/2002 | Dutta et al. | 709/313 |
| 2003/0023435 A1 * | 1/2003 | Josephson | 704/235 |
| 2005/0066024 A1 * | 3/2005 | Crocitti et al. | 709/223 |
| 2006/0042884 A1 * | 3/2006 | Abe et al. | 187/380 |
| 2007/0114295 A1 * | 5/2007 | Jenkins | 236/51 |
| 2007/0220907 A1 * | 9/2007 | Ehlers | 62/126 |
| 2009/0057427 A1 * | 3/2009 | Geadelmann et al. | 236/51 |
| 2009/0063678 A1 | 3/2009 | Maegawa et al. | 709/224 |
| 2009/0249042 A1 | 10/2009 | Kaneko et al. | 712/225 |

FOREIGN PATENT DOCUMENTS

| | | |
|---|---|---|
| JP | 2005-332272 A | 12/2005 |
| JP | 2006-129283 A | 5/2006 |

OTHER PUBLICATIONS

Moriaki Azegami and Hideeaki Fujiyoshi, A systematic Approach to Intelligent Building Design, Oct. 1993, IEEE Communication Magazine, Pertinent pages.*

Peter M. Corcoran and Joe Desbonnet, Browser Style Interfaces to a Home Automation Network, Jun. 1997, IEEE, Pertinent pages.*

U.S. Appl. No. 12/407,855, filed Mar. 20, 2009, Kaneko, et al.

U.S. Appl. No. 12/196,458, filed Aug. 22, 2008, Maegawa, et al.

Japanese Office Action dated May 8, 2012 from corresponding JP 2008-064234.

* cited by examiner

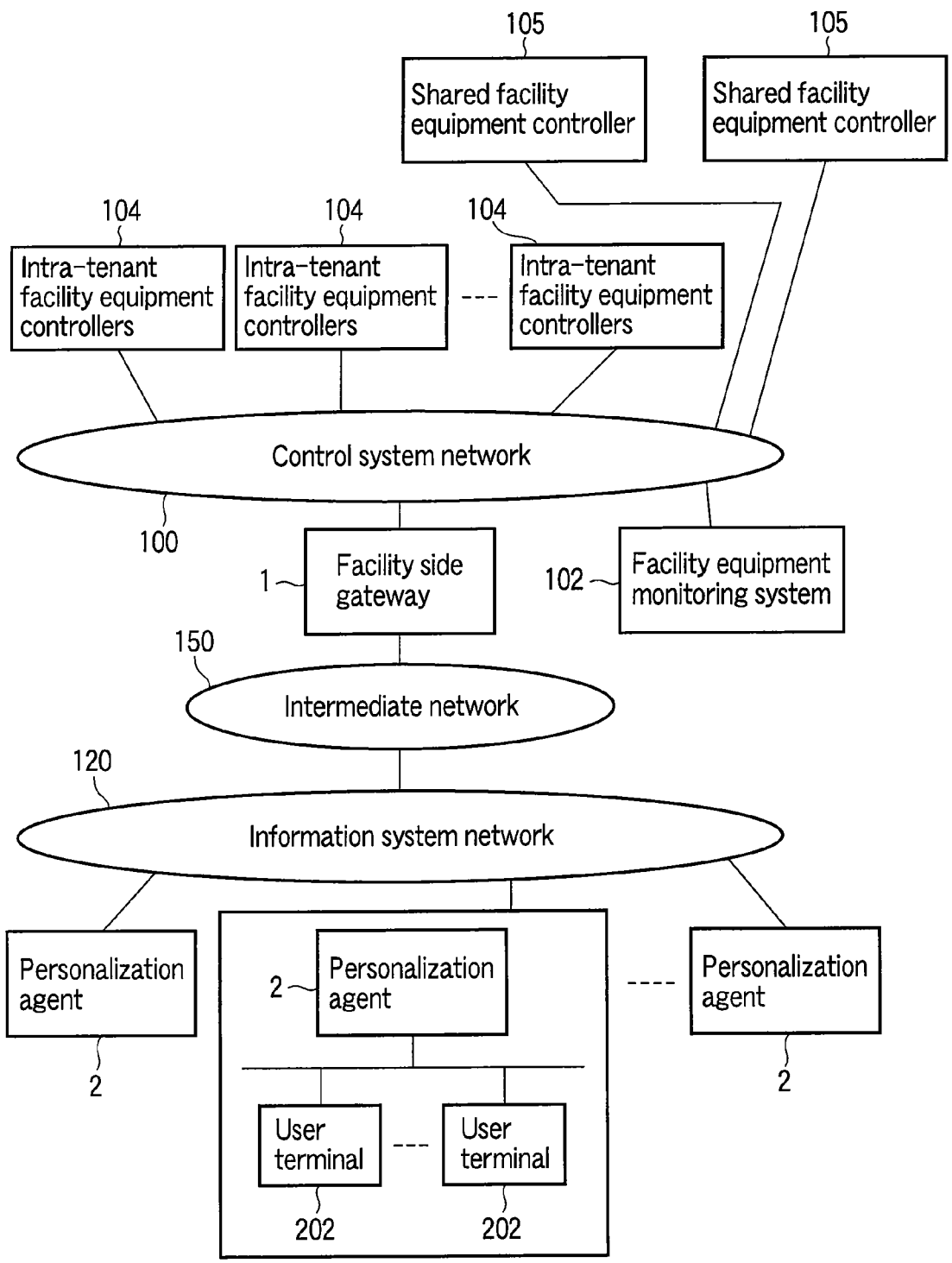
F I G. 1

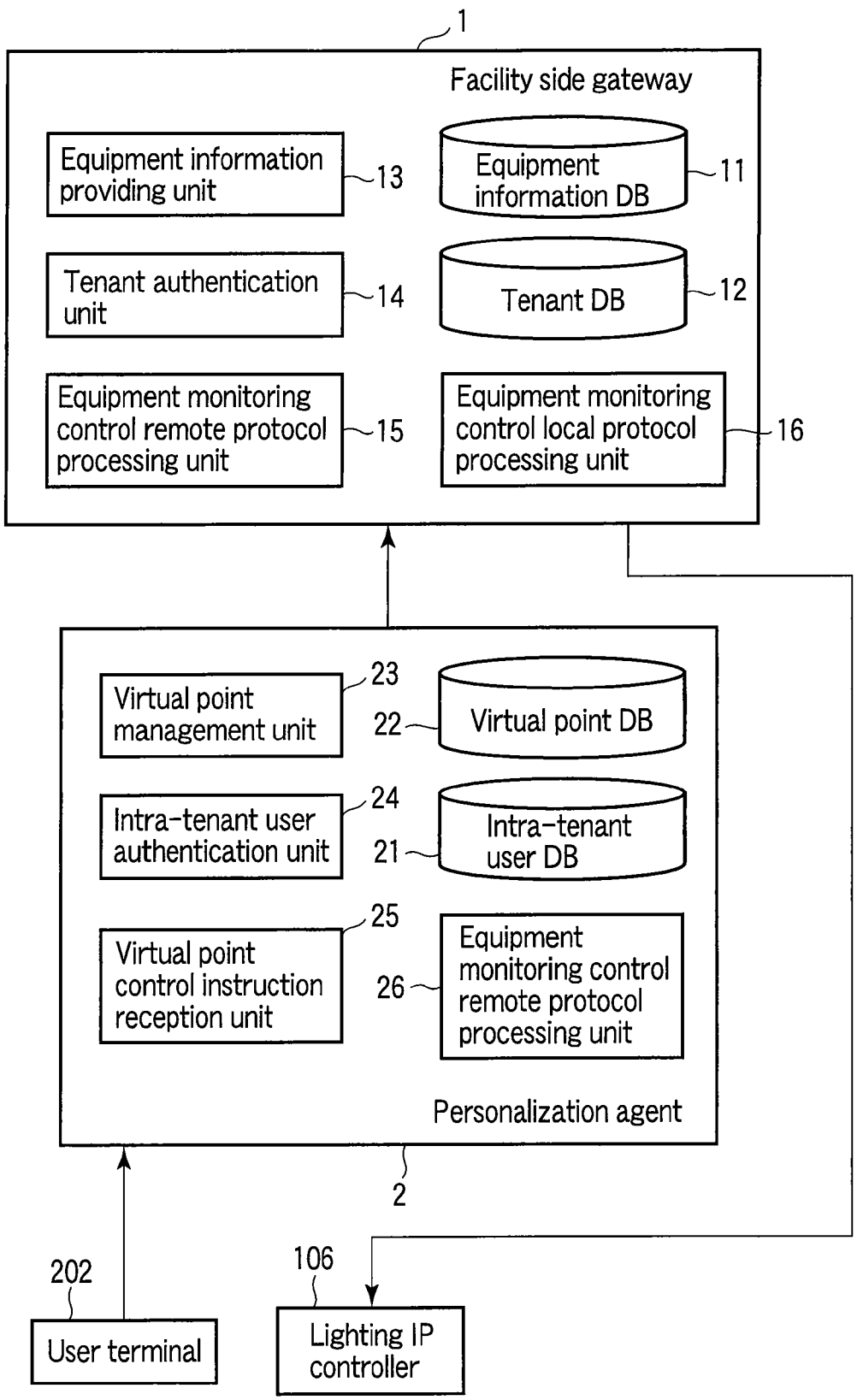
F I G. 3

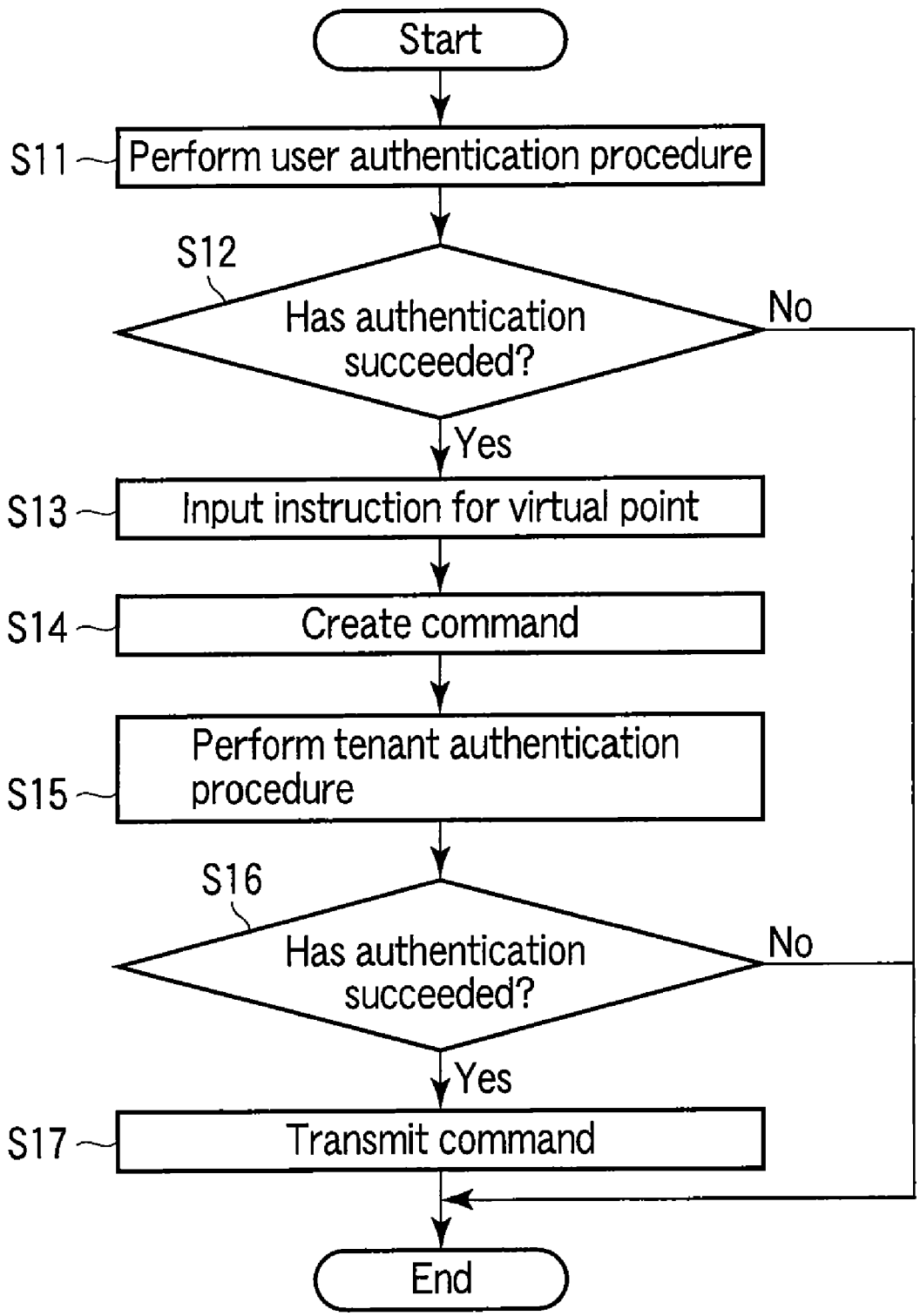
F I G. 4

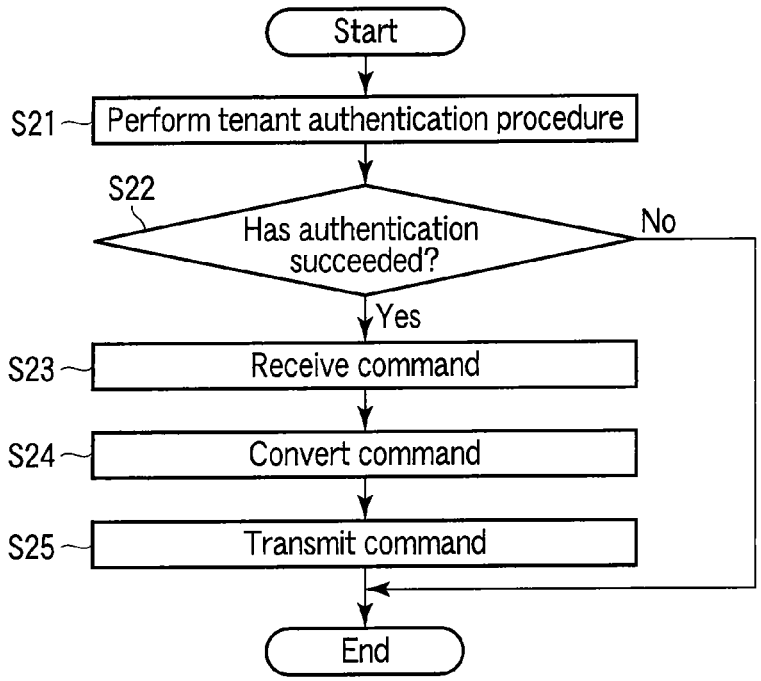

FIG. 5

| Tenant identifier (TID) | Tenant name | Authentication information | Operable equipment list |
|---|---|---|---|
| TENANT-A | ○○office | XXXXXX | AC001, LT001,··· |
| TENANT-B | □□company | YYYYYY | AC002, LT002,··· |
| TENANT-C | XX communication | ZZZZZZ | AC003, LT003,··· |
| ... | ... | ... | ... |

FIG. 6

| Equipment identifier (EID) | Equipment type | Equipment name | Point identifier set |
|---|---|---|---|
| AC001 | Air conditioner | Air conditioner X | {AC001-BO, AC001-AO} |
| LT001 | Lighting | Lighting Y | {LT001-BO} |
| LT002 | Lighting | Lighting Z | {LT002-BO, LT002-AO} |
| ... | ... | ... | ... |

FIG. 7

| Point identifier (PID) | Point name | IP controller information |
|---|---|---|
| AC001-BO | Air conditioner X_switch | XXX.XXX.XXX.XXX |
| AC001-AO | Air conditioner X_temperature | YYY.YYY.YYY.YYY |
| LT001-BO | Lighting Y_switch | ZZZ.ZZZ.ZZZ.ZZZ |
| ... | ... | ... |

FIG. 8

| Virtual point identifier (VPID) | User identifier (VID) | Equipment list {GID, EID} |
|---|---|---|
| VP0001 | USER-A | {G001, AC001}, {G001, LT001}, ... |
| VP0002 | USER-A | {G001, AC002}, {G001, LT002}, ... |
| VP0003 | USER-B | {G001, AC003}, {G001, LT003}, ... |
| ... | ... | ... |

FIG. 9

| User identifier (UID) | User authentication information | User name | Gateway information {GID, TID} |
|---|---|---|---|
| USER-A | XXXX | Taro | {G001, TENANT-A} |
| USER-B | YYYY | Hanako | {G001, TENANT-A} |
| USER-C | ZZZZ | Jiro | {G001, TENANT-A} |
| ... | ... | ... | |

FIG. 10

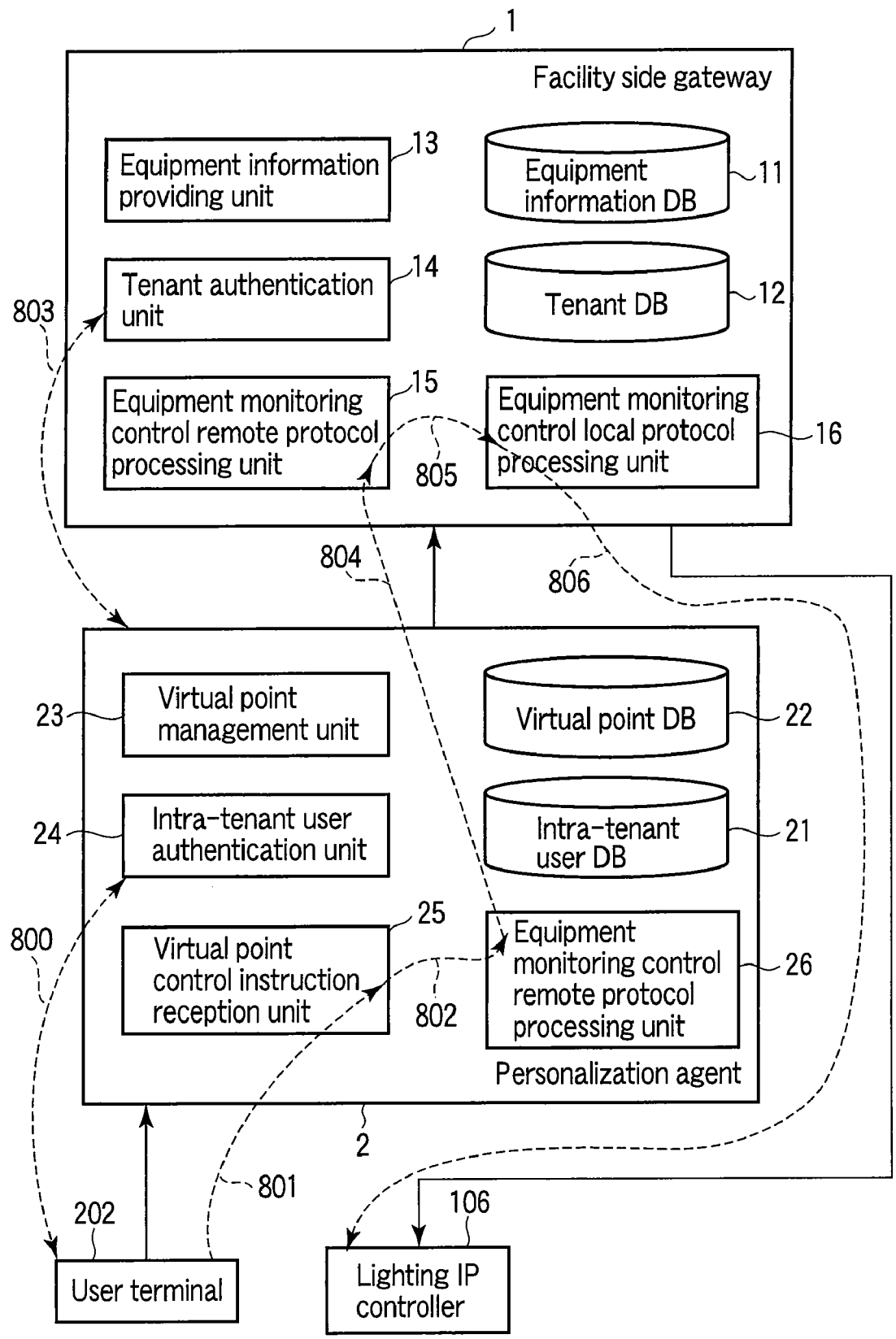
F I G. 12

FACILITY EQUIPMENT COOPERATION SYSTEM, EQUIPMENT CONTROL METHOD, AND AGENT APPARATUS

CROSS-REFERENCE TO RELATED APPLICATIONS

This application is based upon and claims the benefit of priority from prior Japanese Patent Application No. 2008-064234, filed Mar. 13, 2008, the entire contents of which are incorporated herein by reference.

BACKGROUND OF THE INVENTION

1. Field of the Invention

The present invention relates to a facility equipment cooperation system, equipment control method, and agent apparatus which allow an apparatus on a network for an information system to control facility equipment on a network for a control system.

2. Description of the Related Art

In order to achieve labor saving or energy saving, a building automation system (BAS) has been developed by adopting up-to-date techniques. Currently, advanced building facility intensive management using IP network techniques has been implemented.

For example, remote monitoring for remote building management can be implemented by extending a network for a building automation system to the outside by using a virtual network technique such as a VPN. Alternatively, the requirement that "a building manager remotely performs building management" can be satisfied by using a remote desktop environment technique such as RDP for the operation window of a management terminal for intensive building management.

Consider, for example, remote control which allows the user to turn on/off lightings in a building by operating a cellular phone. For such operation, a system which allows "a registered user to perform lighting-on/off operation via a cellular phone" can be implemented by using a Web server scheme of booting up a Web server which can be accessed from the cellular phone, making the Web server provide user management and an operation window, and transmitting a lighting-on/off control instruction to a building automation system as a result of operation on the window on the cellular phone.

For example, JP-A 2005-332272(KOKAI) discloses a service of connecting a conference reservation server on the OA side to a building automation system. This service is a model in which a server installed on the building automation system side interprets and executes a global change command for a plurality of facility equipment states from a conference reservation server.

As described above, a building automation system has been extended while the IT technology has been actively adopted.

Recently, business systems in intranets and content service systems in the Internet have vigorously promoted service cooperation such as the creation of new services by combining different types of services and the effective use of conventional services. When a building automation system is to participate in service cooperation, it is necessary to make the building automation system cooperate with a system outside the control of the building automation system instead of implementing services in the conventional form of the extension of the building automation system. That is, it is necessary to implement mutual connection between different management domains.

Connecting a building automation system to a different management domain, however, cannot simply implement even "cooperation between a building automation system and intra-tenant systems in the building" as one of the simplest cases. For example, the technique disclosed in JP-A 2005-332272(KOKAI) is not premised on the use of the technique in a building in which a plurality of tenants are resident. That is, there is no consideration about how to connect and manage a network which manages each intra-tenant system and a network for a building automation system, the information management cost which is produced when user information in each tenant is kept on the building automation system side, and the like.

In the conventional technology, there is no consideration about problems concerning the cooperation and authentication between a plurality of intra-tenant systems and a building automation system. This imposes great restrictions on a user in each tenant in a building when he/she tries to control facility equipment on the building automation system side from a corresponding intra-tenant system.

BRIEF SUMMARY OF THE INVENTION

According to an aspect of the present invention, there is provided a facility equipment cooperation system including a gateway apparatus connecting to a plurality of pieces of facility equipment in a building via a control system network, and an agent apparatus communicating with the gateway apparatus, via an information system network other than the control system network and installing for each tenant in the building, the agent apparatus comprising: a storage unit configured to store not less than one piece of virtual point information defining a virtual point combined with not less than one piece of facility equipment as an operation target; a user authentication unit configured to perform user authentication for a user associated with a client apparatus; a request reception unit configured to receive a request for control on any of the virtual points from the client apparatus; a first command creation unit configured to create a remote control command based on a specific remote protocol for the facility equipment associated with the request based on the virtual point information associated with the request when the request has been received from the client apparatus and the user authentication associated with the client apparatus has succeeded; and a first command transmission unit configured to transmit the remote control command to the gateway apparatus via the information system network when tenant authentication for a tenant associated with the agent apparatus which is performed by the gateway apparatus has succeeded, and the gateway apparatus comprising: a tenant authentication unit configured to perform the tenant authentication associated with the agent apparatus; a command reception unit configured to receive the remote control command from the agent apparatus via the information system; a second command creation unit configured to create a local control command based on a specific local protocol for the facility equipment associated with the remote control command based on the remote control command when the remote control command has been received from the agent apparatus and the tenant authentication associated with the agent apparatus has succeeded; and a second command transmission unit configured to transmit the created local control command to the facility equipment or a controller of the facility equipment associated with the local control command via the control system network.

According to another aspect of the present invention, there is provided an agent apparatus communicating with a gateway apparatus connecting to a plurality of pieces of facility equipment in a building via a control system network, via an information system network other than the control system network, and installing for each tenant in the building, comprising: a storage unit configured to store not less than one piece of virtual point information defining a virtual point combined with not less than one piece of facility equipment as an operation target; a user authentication unit configured to perform user authentication for a user associated with a client apparatus; a request reception unit configured to receive a request for control on any of the virtual points from the client apparatus; a command creation unit configured to create a remote control command based on a specific remote protocol for the facility equipment associated with the request based on the virtual point information associated with the request when the request has been received from the client apparatus and the user authentication associated with the client apparatus has succeeded; and a command transmission unit configured to transmit the remote control command to the gateway apparatus via the information system network when tenant authentication for a tenant associated with the agent apparatus which is performed by the gateway apparatus has succeeded.

BRIEF DESCRIPTION OF THE SEVERAL VIEWS OF THE DRAWING

FIG. 1 is a block diagram showing an arrangement example of an intra-office-building network system according to an embodiment;

FIG. 3 is a block diagram showing an arrangement example of a facility equipment cooperation system including a facility side gateway and a personalization agent according to the embodiment;

FIG. 4 is a flowchart showing an example of a processing sequence performed by the personalization agent;

FIG. 5 is a flowchart showing an example of a processing sequence performed by the facility side gateway;

FIG. 6 is a view showing an example of a tenant table;

FIG. 7 is a view showing an example of an equipment set table;

FIG. 8 is a view showing an example of a point information table;

FIG. 9 is a view showing an example of a virtual point table;

FIG. 10 is a view showing an example of a user table;

FIG. 12 is a block diagram showing an example of the operation of the facility equipment cooperation system;

DETAILED DESCRIPTION OF THE INVENTION

Figure 2:
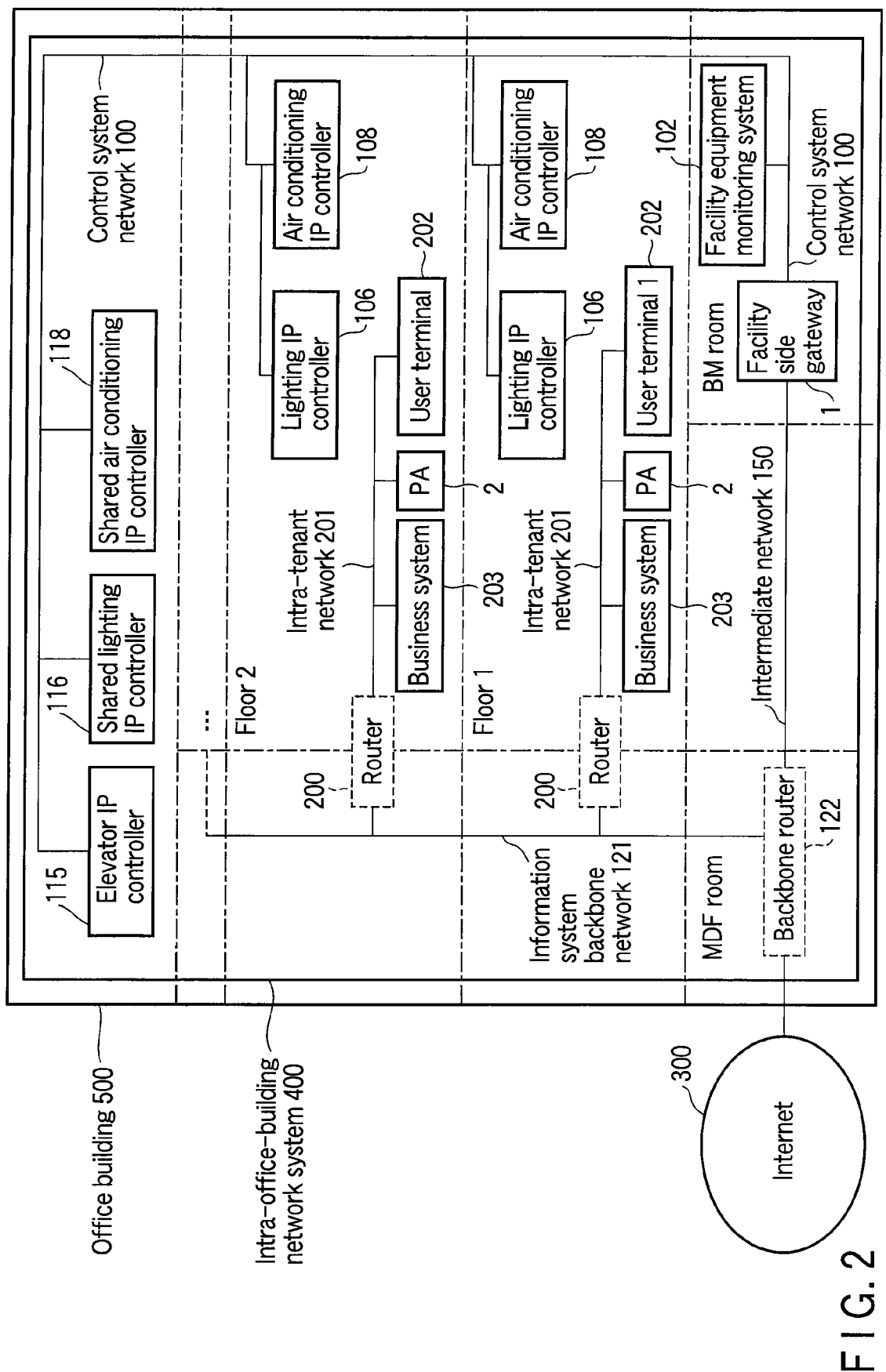
FIG. 2 is a block diagram showing an arrangement example of the intra-office-building network system in more detail.

An embodiment of the present invention will be described below with reference to the views of the accompanying drawing.

This embodiment is configured to implement various kinds of cooperation between various user systems in tenants and a building automation system, e.g., "an energy-saving function (lighting saver and air conditioner saver) of not only activating screen saver in the PC of a user in a tenant when the PC is not in use but also setting building facility equipment such as an air conditioner and a lighting near the seat of the user in the power saving mode in conjunction with the activation of screen saver", "an automatic setting function of extending the operation of building facility equipment such as a lighting and an air conditioner in accordance with an approval of an overtime application in a labor management system in a tenant", and "a function of implementing a single sign-on service or operation right management for authentication for remote control on building facility equipment by using a unified authentication system in a tenant". In order to implement such cooperation, it is desirable to manage intra-tenant user information in some place in a system. It is also desired to easily connect a system in each tenant to the building automation system without departing from the respective operation policies.

Consider, from the above viewpoint, cooperation between an intra-tenant system and a building automation system.

(i) User Authentication

Considering, for example, that it is inappropriate to allow a user in a given tenant to control facility equipment in another tenant, it is preferable to allow the user to control only facility equipment which he/she has the right to control. For this purpose, it is desirable to execute authentication for a user when the user is to control facility equipment. In the conventional technology, however, there is no such concept as users in a building automation system to which pieces of facility equipment as control targets belong.

(ii) Degree of Freedom in Facility Control by User

For example, it is preferable to allow a user to link facility networks as freely as possible within the scope of authority. For example, in an office, it is preferable for a user to automatically turn off a lighting and an air conditioner around his/her desk when he/she returns home or to change settings by the authority of the user upon change of the position of his/her seat due to personnel reshuffle or the like. It is also desirable for the user to customize control contents or cooperation contents for facility equipment, as needed. Such mechanisms, however, have not been known.

(iii) Degree of Freedom in Introduction of Services by User

It is preferable to minimize restrictions on facility control by a user. From the viewpoint of the user, it is preferable to allow him/her to control facilities via a cellular phone or a PDA as well as a PC. It is also preferable to eliminate the necessity of any special applications for control. In addition, portions connected to a user side network need to comply with the operation policy on the user side. For example, this requires installation of user side management software with restrictions being imposed on software/hardware that can be used. That is, even simple connection of such a function will complicate management on the building automation system side. In other words, the building automation system itself is preferably connected to a user side network as loosely as possible.

(iv) Protection of Building Automation System Against Network

A building manager may want to impose restrictions on the contents of user's operation on facilities. In the case of air conditioning, "the facility manager may want to prohibit setting of a cooling temperature below the temperature set by him/her" or "may want to prohibit changing of a temperature setting at a predetermined rate or more (e.g., 1°/min). It is preferable to implement these operation policies upon minimizing load on a user.

In consideration of them, it is desirable to provide a personal-use framework system for a building automation system. That is, this system can manage a service provision state in tenants in a building, easily cooperate with systems in tenants, give users in tenants certain degrees of freedom in the use of facility equipment, and prohibit interference with building management operation, via "a gateway which can perform status acquisition/operation setting with respect to facility equipment connected to a network (facility network) for the building automation system".

This embodiment therefore has the following arrangement as will be described in detail later.

(1) The embodiment uses a facility side gateway installed in a building management domain and a user side personalization agent which is installed in a tenant side management domain and connected to the facility side gateway.

(2) User management on the building management side is performed such that only tenant management is performed in terms of the management of a division where tenants are resident, and user management on users in each tenant is performed on each tenant side.

(3) The facility side gateway provides access to facility equipment under the management of the building automation system, performs tenant authentication with a personalization agent, and provides information about available facility equipment and control ranges to the personalization agent.

(4) The personalization agent authenticates a user in a tenant, and transmits, to the facility side gateway, a control command for equipment within the range permitted by the building automation system. The agent also manages user-specific equipment cooperation setting information.

This embodiment will be described in detail below.

There will now be described an arrangement example of an intra-office-building network system referring to FIG. 1.

One or more tenants exist in an office building in which the intra-office-building network system of this embodiment is installed. In all or some of the tenants, personalization agents 2 (to be described in detail later) dedicated to the respective tenants are installed. Although this embodiment is based on the assumption that the personalization agents 2 are installed in a plurality of tenants, the embodiment can be applied to a case in which the personalization agent 2 is installed in only one tenant.

The intra-office-building network system roughly includes two networks, i.e., a network for a control system and a network for an information system. The control system network belongs to the building automation system, and is a network for management of intra-building facilities, monitoring control, and the like in this case. The network for the information system is a network for OA and the like.

The network for the control system includes a control system network 100, a facility side gateway 1, and a facility equipment monitoring system 102.

The network for the control system includes a controller (intra-tenant facility equipment controller) 104 for monitoring control on various facility equipment (e.g., lightings and an air conditioner) in each tenant, and a controller (shared facility equipment controller) 105 for monitoring control on various shared facility equipment (e.g., lightings, an air conditioner, and an elevator). The number of intra-tenant facility equipment controllers 104 is arbitrary. The number of shared facility equipment controllers 105 is also arbitrary.

Note that a controller for facility equipment may be incorporated in the facility equipment or may be an apparatus independent of the facility equipment. Monitoring control on facility equipment will be described, with focus being on the controller instead of the main body of the facility equipment.

The network for the information system includes an information system network 120 and the personalization agents 2 installed for the respective tenants. The number of personalization agents 2 is arbitrary.

The network for the information system also includes apparatuses as terminals corresponding to the personalization agents 2. Assume that the terminals include, for example, user terminals 202 of users in the respective tenants (Note that FIG. 1 exemplifies the user terminals 202 for only one personalization agent 2). The number of user terminals 202 in each tenant is arbitrary.

The user terminals 202 of users in each tenant can be connected to the personalization agent 2 in the tenant.

The personalization agents 2 can also communicate with the facility side gateway 1 via the information system network 120 and an intermediate network 150.

The arrangements and implementations of the information system network 120, intermediate network 150, and control system network 100 are not specifically limited.

Although the network for the information system and the network for the control system are connected to each other via the intermediate network 150 in FIG. 1, they may be directly connected. That is, the information system network 120 may be directly connected to the facility side gateway 1.

Note that only one facility side gateway 1 can be installed for the overall system, or can be installed for each subsystem or each floor (i.e., a plurality of facility side gateways may be installed for the overall system). Note that FIG. 1 exemplified the former case.

The personalization agents 2 can communicate with the facility side gateway 1 via only the network in this office building or can communicate with the facility side gateway 1 via the information system network 120 and the Internet. Various arrangements are available to connect the personalization agents 2 to the facility side gateway 1 (that is, it suffices if the personalization agents 2 can communicate with the facility side gateway 1 without via the control system network 100).

There will now be described a more concrete example of the above intra-office-building network system referring to FIG. 2.

Referring to FIG. 2, reference numeral 500 denotes an office building; 400, a network system (intra-office-building network system) in the office building 500; and 300, the Internet. The office building 500 includes one or more tenants (FIG. 2 exemplifies two tenants, i.e., a tenant #1 on floor 1 and a tenant #2 on floor 2).

As described above, the intra-office-building network system 400 roughly includes two networks, i.e., the network for the control system and the network for the information system.

The network for the control system includes the control system network 100, the facility side gateway 1, and the facility equipment monitoring system 102, as described above.

In the case shown in FIG. 2, the network for the control system includes, as the intra-tenant facility equipment controllers 104, the lighting IP controller 105 for intra-tenant lightings and an air conditioning IP controller 108 for intra-tenant air conditioning in the tenant #1, and a lighting IP controller 106 and an air conditioning IP controller 108 in the tenant #2. In addition, the network for the control system includes, as shared facility equipment controllers 105, an elevator IP controller 115 for an elevator, a shared lighting IP controller 116 for shared lightings, and a shared air conditioning IP controller 118 for shared air conditioning. These controllers are connected to the control system network 100.

An operator or the like in a building management room (BM room) can perform monitoring control on each facility equipment via each IP controller by operating the facility equipment monitoring system 102 as in the conventional technology.

In the case shown in FIG. 2, the network for the information system includes intra-tenant networks 201 (provided for the respective tenants). FIG. 2 exemplifies the two intra-tenant networks 201.

Personalization agents (each abbreviated to an agent hereinafter and expressed by "PA" in FIG. 2) 2, other types of systems, terminals, and the like are connected to each intra-tenant network 201. FIG. 2 exemplifies the user terminals 202 as the above terminals, and business systems 203 as various other systems. Note that the hardware/software/function and the like which each user terminal 202 has are not specifically limited. The types (or business service contents) and number of business systems 203 are arbitrary. In addition, other apparatuses can be connected to the intra-tenant networks 201.

In the case in FIG. 2, an information system backbone network 121 is connected to each intra-tenant network 201 via a router 200.

In the case in FIG. 2, each intra-tenant network 201 is connected to the Internet 300 via the router 200, the information system backbone network 121, and a backbone router 122. Each intra-tenant network 201 is connected to the facility side gateway 1 (connected to the control system network 100 in the network for the control system) via the router 200, the information system backbone network 121, the backbone router 122, and the intermediate network 150.

Note that FIG. 2 shows an example, and a variety of methods are available to connect the personalization agents 2 to the facility side gateway 1. The method to be used to connect the personalization agents 2 to the facility side gateway 1 may be fixed to one or may be selected from a plurality of methods as needed.

FIG. 2 exemplifies one tenant for one floor of the office building 500. However, an arbitrary number of tenants can exit on one floor (it suffices to include a floor on which no tenant exists). It suffices to determine for each tenant, as needed, whether to provide the personalization agent 2 for each tenant.

The following description is based on the assumption that one agent 2 is provided for each tenant. However, this does not exclude an arrangement in which a plurality of agents 2 are provided for each tenant.

Note that the agent 2 may be installed in a department (e.g., the building management room in FIG. 2) which manages the overall building, in addition to the tenants. In this case, for example, an operator in the building management room operates the agent 2 from the terminal in the room.

The information system backbone network 121 used by each intra-tenant network 201 will be described in detail next.

The information system backbone network 121 can basically have any arrangement. The backbone router 122 may not be required depending on the arrangement of the information system backbone network 121.

In the information system backbone network 121 of the office building 500, for example, trunk lines which are wired to the respective floors of the office building 500 are concentrated in a communication line concentration board called MDF (Main Distributing Frame). A connection is made from this MDF to the Internet 300. A distributing board called IDF (Intermediate Distribution Frame) for connecting the network in each floor to the MDF is installed on each floor.

Conventionally, communication facilities like those described above have been mainly applied to telephone lines. Recently, however, an Internet circuit has become an important infrastructure, and has been constructed as one of facilities in a building. For example, optical cables are wired to the respective floors in the building by a scheme called FTTB (Fiber To The Building). This allows the tenants in the building to use stable broadband lines. Obviously, the information system backbone network 121 can have such an arrangement.

The information system backbone network 121 can have other various arrangements.

Note that in this embodiment, it is not essential that a connection can be made from the information system backbone network 121 to the Internet 300.

The control system network 100 will be described in detail next.

The control system network 100 is configured to unify facility equipment (e.g., lightings and air conditioners) in the respective tenants, facility equipment (e.g., shared lightings, shared air conditioners, and elevators) in shared portions of the building, and the like via networks and to intensively perform, in the building management room, monitoring control on each facility equipment (via, e.g., the facility equipment monitoring system 102). The control system network 100 is spread across the floors (tenants). For example, it suffices to use a protocol such as BACnet/IP which works on an IP network. However, this embodiment is not limited to this.

The intermediate network 150 which connects the control system network 100 to the information system backbone network 121 will be described in detail next.

The intermediate network 150 is used to allow each intra-tenant network 201 to access the control system network 100 from the information system backbone network 121. The control system network 100 is an external network outside the management area when viewed from each intra-tenant network 201.

Note that FIG. 2 exemplifies the arrangement in which the exit of the intra-office-building network system 400 is one router (backbone router 122). However, the information system backbone network 121 can be configured to be unified at the media level and to be allowed to freely select a host provider on an IP network. That is, any arrangement can be employed as long as it can perform IP communication between the information system backbone network 121 and the control system network 100.

There will now be described an arrangement example of a facility equipment cooperation system as the main part of the intra-office-building network system referring to FIG. 3.

As shown in FIG. 3, the facility equipment cooperation system of this embodiment mainly includes one or a plurality of facility side gateways 1 which are arranged at a node between the network for the control system and the network for the information system (a node between the control system network 100 and the intermediate network 150 in the case shown in FIG. 2) and the agent 2 of each tenant.

FIG. 3 shows only one facility side gateway 1 and one agent 2, and exemplifies only one user terminal 202 as a terminal of the agent 2, and only the lighting IP controller 106 as a facility equipment IP controller.

Roughly speaking, the agent 2 manages information concerning each user belonging to the tenant in which the agent is installed, and the facility side gateway 1 manages information concerning each facility equipment and information concerning each tenant.

Roughly speaking, authentication is performed in two steps when a user is to control facility equipment. That is, the agent 2 and the facility side gateway 1 share tasks (or cooperate) such that the agent 2 performs user authentication, and the facility side gateway 1 performs tenant authentication.

There will now be described a rough example of a processing sequence performed by an agent referring to FIG. 4.

The agent 2 performs a user authentication procedure first (step S11). If authentication succeeds (step S12), the user inputs an instruction for a virtual point (to be described later) (step S13). The agent 2 then creates a control command for monitoring control on specific facility equipment by using the first protocol on the basis of the input instruction (step S14). The agent 2 then performs tenant authentication with the facility side gateway 1 (step S15). If authentication succeeds (step S16), the agent 2 transmits a control command based on the first protocol to the facility side gateway 1 (step S17).

There will now be described a rough example of a processing sequence performed by a facility equipment side gateway referring to FIG. 5.

The facility side gateway 1 performs the above tenant authentication procedure (step S21). If authentication succeeds (step S22) and the facility side gateway 1 receives the above control command (step S23), the gateway converts the received control command into a command based on the second protocol (step S24). The facility side gateway 1 then gives the control command based on the second protocol to the specific facility equipment or the controller of the specific facility equipment (step S25). Note that the facility side gateway 1 returns a monitoring control result to the agent 2 as needed.

The first protocol is a predetermined remote protocol to be used for the exchange of control commands between the agent 2 and the facility side gateway 1. As the first protocol, for example, BACnet/WS or o.BIX can be used. However, this embodiment is not limited to this. The second protocol is a local protocol used in the network for the control system. As the second protocol, for example, BACnet/IP can be used. However, this embodiment is not limited to this. A control command based on the remote protocol will be also referred to as a remote control command. A control command based on the local protocol will be also referred to as a local control command. Assume that in this embodiment, the term "control" is used in a broad sense to include "monitor" and the like.

Note that FIGS. 4 and 5 are examples. This embodiment is not limited to them. For example, steps S13 and S14 in FIG. 4 can be performed after authentication in steps S15 and S16.

The agent 2 and the facility side gateway 1 will be described in more detail next.

As shown in FIG. 3, the agent 2 includes an intra-tenant user database (intra-tenant user DB) 21, a virtual point database (virtual point DB) 22, a virtual point management unit 23, an intra-tenant user authentication unit 24, a virtual point control instruction reception unit 25, and an equipment monitoring control remote protocol processing unit 26.

The intra-tenant user DB 21 holds user authentication information concerning the tenant.

The virtual point DB 22 holds virtual point information for each user. Virtual point information is customized information in which the synchronous operation of one or a plurality of pieces of facility equipment is written.

The virtual point management unit 23 manages creation, modification, and deletion of virtual point information.

The intra-tenant user authentication unit 24 performs authentication of a user in the tenant.

The virtual point control instruction reception unit 25 receives a control instruction (request) for a virtual point.

The equipment monitoring control remote protocol processing unit 26 creates a control command based on the remote protocol on the basis of the received instruction (request) for the virtual point, and transmits the created remote control command to the facility side gateway 1.

As shown in FIG. 3, the facility side gateway 1 includes an equipment information database (equipment information DB) 11, a tenant database (tenant DB) 12, an equipment information providing unit 13, a tenant authentication unit 14, an equipment monitoring control remote protocol processing unit 15, and an equipment monitoring control local protocol processing unit 16.

The equipment information DB 11 holds the equipment information of each facility equipment (e.g., the name and function of each facility equipment) connected to the control system network 100.

The tenant DB 12 holds the tenant information of each tenant as a user of a division in the office building.

The equipment information providing unit 13 provides equipment information held in the equipment information DB 11 to the tenant side.

The tenant authentication unit 14 performs authentication of a tenant associated with each agent 2.

The equipment monitoring control remote protocol processing unit 15 receives a remote control command from the agent 2. The equipment monitoring control remote protocol processing unit 15 also performs access control for facility equipment as needed.

The equipment monitoring control local protocol processing unit 16 creates a control command based on the local protocol on the basis of the received remote control command, and transmits the created local control command to a facility equipment controller associated with specific facility equipment on the control system network 100. Note that the equipment monitoring control local protocol processing unit 16 directly transmits a control command to the facility equipment incorporating a facility equipment controller or an equivalent function and uses the incorporated controller or function.

Note that if a plurality of facility side gateways 1 are to be installed, each facility side gateway 1 may hold and process only information concerning of portion which the gateway is in direct charge. If, for example, the facility side gateway 1 is installed for each subsystem or each floor, the facility side gateway 1 may hold only the tenant information of a tenant associated with the subsystem or floor on which the gateway is installed. In this case, it suffices to set (by, for example, the manager), in each agent 2, information indicating the facility side gateway 1 which the agent should access, or to install, in the system, a server which solves the problem concerning "which facility side gateway 1 each agent 2 should access". Alternatively, each agent 2 may output a message to the corresponding facility side gateway 1, and the facility side gateway 1 which has received the message may transfer the message to a server which is in charge of the agent 2.

In this case, the virtual point information stored in the agent 2 is a description of the synchronous operation of a plurality of pieces of facility equipment. For example, operation A is to turn on/off an air conditioner and a lighting near the seat of a given user in an office, and operation B is to turn on/off the lightings in the entire office. Such "operation" is expressed in the form of a virtual point (VP). The user can freely create the virtual point VP. The user can freely make settings to assign the synchronous operation of specific facility equipment to the created virtual point VP.

A description stating a specific facility which the agent 2 is to operate includes the equipment identifier (EID) of the target facility equipment and the identifier of the facility side gateway 1 connected to the control system network 100 to which the facility equipment is connected, i.e., a gateway identifier (GID). That is, customizing the virtual point VP is equivalent to giving a set of pairs of gateway identifiers GID and equipment identifiers EID to the identifier of the virtual point VP, i.e., a virtual point identifier (VPID).

Each type of information will be described next.

The "tenant table" held by the tenant DB 12 of the facility side gateway 1 will be described first.

The tenant table contains information for managing each tenant having the right to use each division in the office building.

FIG. 6 shows an example of the tenant table. This tenant table holds "tenant identifiers (TIDs)" which identify the respective tenants, "tenant names" representing the names of the respective tenants, pieces of "authentication information" used to authenticate the respective tenants, and "operable equipment lists" representing a set of equipment identifiers (EIDs) of pieces of facility equipment which users belonging to the tenants are permitted to operate from the respective tenants, in correspondence with each other.

The "equipment set table" held by the equipment information DB 11 of the facility side gateway 1 will be described next.

The equipment set table contains information concerning a set of points which each facility equipment has.

FIG. 7 shows an example of the equipment set table. This equipment set table holds "equipment identifiers (EIDs)" which identify the respective pieces of facility equipment, "equipment types" representing the types of facility equipment, "equipment names" representing the names of the respective pieces of facility equipment, and "point identifier sets" representing sets of point identifiers (PIDs) which the respective pieces of facility equipment have, in correspondence with each other.

The "point information table" held by the equipment information DB 11 of the facility side gateway 1 will be described next.

The point information table contains information concerning a point which each facility equipment has.

FIG. 8 shows an example of the point information table. This point information table holds "point identifiers (PIDs)" which identify the respective points, "point names" representing the names of the respective points, and pieces of "IP controller information" as pieces of access information for IP controllers which are in charge of controlling the respective points, in correspondence with each other.

In the case shown in FIG. 8, each point identifier includes a first code portion (e.g., "AC001" of "AC001-BO") unique to corresponding facility equipment and a second code portion (e.g., "BO" of "AC001-BO") which discriminates a point in the facility equipment. In this concrete example, an equipment identifier (EID) is used as the first code portion. In addition, for example, the second code portion can include a code which can identify "whether the state of the corresponding point (e.g., the ON/OFF state of a power switch or a continuous or discrete value such as an illuminance, temperature, or air flow rate) is writable information or read-only information". For example, "O" represents writable information, and I represents read-only information. In addition to the above code, the second code portion may include a code which can identify whether the corresponding information takes a discrete or continuous value, identify, when the information takes a discrete value, which state it can take, or identify, when the information takes a continuous value, which values it can take as the upper and lower limit values.

In the case in FIG. 8, a point name includes a first name portion (e.g., "air conditioner X" of "air conditioner X_switch") unique to the facility equipment and a second name portion (e.g., "switch" of "air conditioner X_switch") which discriminates a point in the facility equipment.

Assume that in the case in FIG. 8, as IP controller information, the IP address of the IP controller is used.

The "virtual point table" held by the virtual point DB 22 of the agent 2 will be described next.

The virtual point table contains pieces of information concerning virtual points.

FIG. 9 shows an example of the virtual point table. This virtual point table holds "virtual point identifiers (VPIDs)" identifying the respective virtual points, "user identifiers (UIDs)" indicating the owners of the virtual points, and "equipment lists" representing pieces of point target equipment at the virtual points.

In the case in FIG. 9, an equipment list includes a set of combinations of gateway identifiers GID and equipment identifiers EID.

When a predetermined parameter such as the temperature of target facility equipment is to be changed in operation corresponding to the virtual point VP, an actual set value as the parameter can be based on the type of control command (in other words, the level of abstraction of a control command for the agent 2 can be increased). In a use case from the user terminals 202 or business system 203 connected to the agent 2, the facility equipment operation logic implemented on the user terminals 202 side or the business system 203 side can be simplified more by a qualitative instruction such as "an instruction to lower the temperature below the current temperature" or "an instruction to slightly dim the lighting" than by a quantitative instruction such as "an instruction to set the temperature to 26° C." or "an instruction to set the illuminance to 800 Lx".

For example, for the virtual point VP defined in FIG. 9, a command to designate whether to turn on or off the virtual point VP can be defined. The method of implementing an ON setting is not limited to the method of simply issuing, on the agent 2 side, a command to turn on a point representing a switch of a device. For example, it suffices to use a method of setting, for a lighting, the illuminance value of a point which represents an illuminance setting to 80% and a method for setting, for an air conditioner, to the setting of a point representing an air flow rate to "high".

It is preferable to allow each agent 2 to separately set such VP commands.

Obviously, it suffices to allow a user to directly designate specific numerical values, levels, and the like such as a set temperature and a set air flow rate as the contents of operation on facility equipment.

The "user table" held by the tenant user DB 21 of the agent 2 will be described next.

The user table contains pieces of authentication information and individual information of users in tenants.

FIG. 10 shows an example of the user table. This user table holds "user identifiers (UIDs)" identifying the respective users, pieces of "user authentication information" which are used to authenticate users in the tenants, "user names" representing the names of the users, and pieces of "gateway information" which are used when the users access the facility side gateway 1 from the agents 2.

In the case in FIG. 10, gateway information includes a combination of the gateway identifier GID and the tenant identifier TID of the tenant which is assigned by the gateway identifier GID.

Assume that the tenant identifier TID is a unique value for each facility side gateway 1 (for each gateway identifier GID). This is for the purpose of mapping the virtual points VP with respect to a plurality of different building management domains. Consider, for example, a case in which a given virtual point VP is assigned to ON/OFF operation of the switches of lightings in both a main building and a compartment. In this case, the facility side gateway 1 on the main building side and the facility side gateway 1 on the compartment side may belong to different buildings, and the tenant identifiers TID may be assigned by the building managers of the respective buildings. Therefore, the above gateway information may sometimes contain a plurality of combinations of {GID, TID}.

Note that the building manager may not want to set each user in each tenant as a management target. That is, consider a case in which the building manager wants to manage only a tenant who is renting part of the building (i.e., a real property) and wants the remaining tenants to manage themselves. For example, in an environment in which personnel such as part-time workers frequently come and go, the building manager is likely to want to use a scheme of entrusting the corresponding tenant to give or take away access right to or from each user and performing authentication on a tenant basis. In order to meet such a need, this embodiment structurally separates tenants as users on the building management side and users inside the tenants. That is, authentication between users in tenants as terminal operators and the agents 2 is performed for each user, while each agent 2 maps users to the tenant identifiers TID, and authentication between the agents 2 and the facility side gateway 1 is performed on a tenant basis.

It is possible that the building manager requires to authenticate all users. In order to meet this requirement, it suffices to perform authentication upon simply mapping tenants and users one to one. In this case, it is preferable not to omit user authentication in the agents 2.

A case in which a user accesses the agent 2 from the user terminals 202 to perform operation at the virtual point VP will be described next.

(1) First of all, the user accesses the agent 2 from the user terminals 202. In the agent 2, the intra-tenant user authentication unit 24 authenticates the user.

After user authentication fails, the user cannot use the agent 2.

(2) After user authentication succeeds, the user can perform operation at the virtual point by accessing the agent 2 via the user terminals 202.

First of all, the user selects the virtual point VP as an operation target. If the virtual point VP is a point at which an operation content should be designated, the user selects the operation content. If, for example, the switch of a lighting or air conditioner is to be turned on/off, the user selects an "ON" instruction or an "OFF" instruction. If the set temperature of the air conditioner is to be changed, the user selects a "temperature rise" instruction or a "temperature fall" instruction (obviously, it suffices to allow the user to select a specific set temperature). If the virtual point VP is a point at which no operation content is to be designated, the user designates no operation content. For example, this corresponds to a case in which a virtual point is operation to acquire the ON state or OFF state of the lighting or acquire the current set temperature of the air conditioner or the current temperature in the room. Note that as an interface via which the user performs, in the agent 2, operation at the virtual point VP, for example, a GUI or any type of interface can be used.

In the agent 2, the virtual point control instruction reception unit 25 acquires a set of combinations of identifiers EID of pieces of facility equipment as control targets and identifiers GID of the facility side gateways 1 corresponding to the identifiers EID from the identifier VPID of the selected virtual point.

(3) Tenant authentication is performed between the agent 2 and the facility side gateway 1 at a predetermined timing. In addition, the agent 2 gives the facility side gateway 1 with GID corresponding to each EID a control command containing an operation command for the facility equipment with the corresponding identifier EID. The facility side gateway 1 then performs necessary operation for each facility equipment on the basis of the corresponding control command. For example, the lighting desired by the user is turned off, or the set temperature of the air conditioner desired by the user is changed. Note that the facility side gateway 1 may notify the user terminal 202 of the operation result via the agent 2 so as to allow the user to refer to the operation result.

A communication sequence in this embodiment will be described below.

Figure 11:
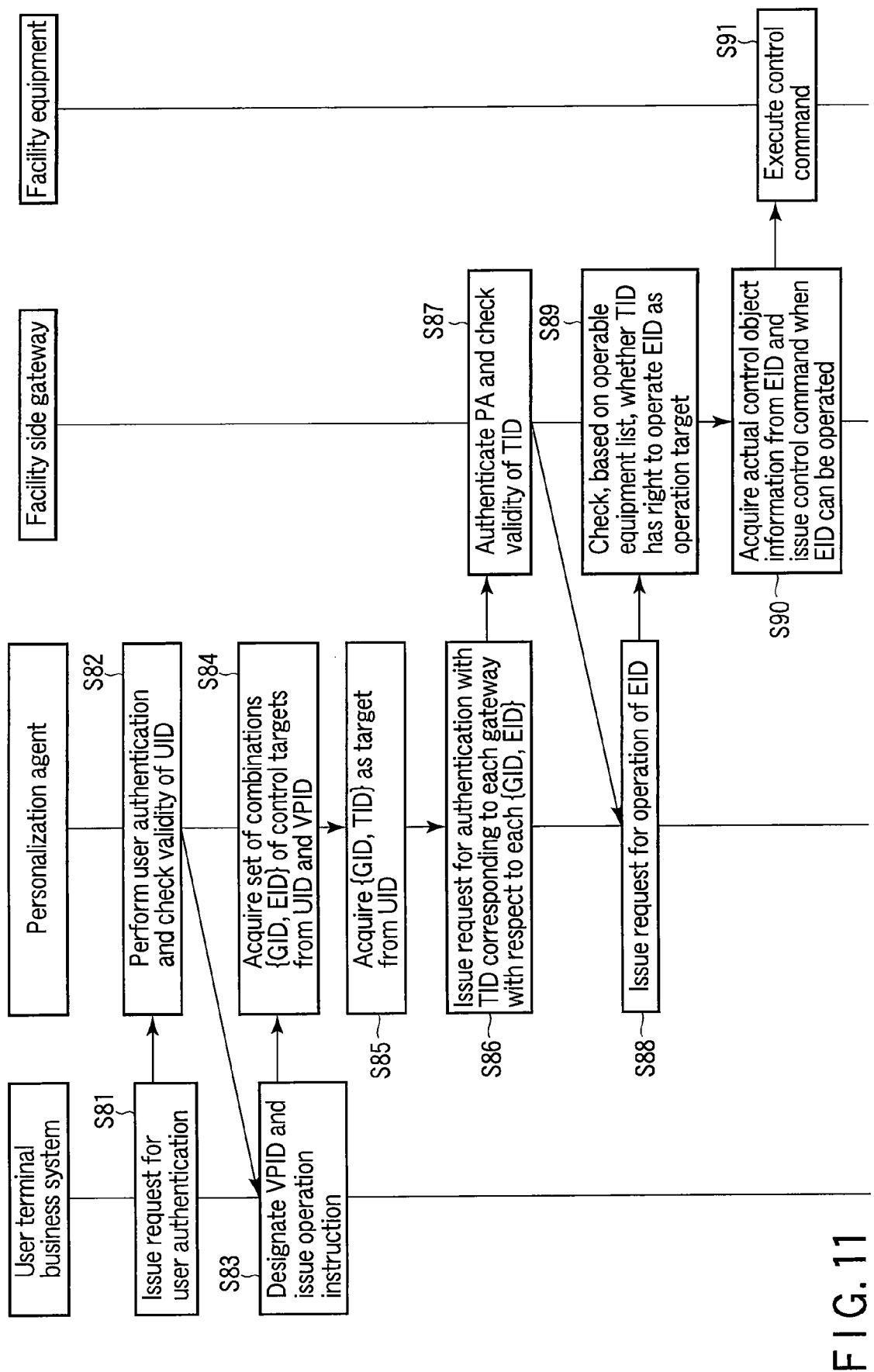
FIG. 11 is a flowchart showing an example of a communication sequence performed by the facility equipment cooperation system.

FIG. 11 shows an example of a communication sequence in a facility equipment cooperation system including a facility side gateway and an agent according to this embodiment. FIG. 12 shows an outline of a procedure sequence between the facility side gateway and the agent. Although FIGS. 11 and 12 each show the case of one facility side gateway 1 as a procedure target, a plurality of facility side gateways 1 can be procedure targets.

First of all, the user accesses the agent 2 from the user terminal 202. Note that the user can access the agent 2 only from a specific (one or a plurality of) terminal or can access the agent 2 from an arbitrary terminal. It also suffices to access the agent 2 from a cellular phone or a PDA. As an access protocol, HTTP is typically used. However, this embodiment is not limited to this.

The user terminal 202 issues a request for user authentication to the agent 2 (step S81) (see 800 in FIG. 12).

Upon receiving the request, the agent 2 performs user authentication on an identifier UID basis by using the intra-tenant user authentication unit 24 (step S82) (see 800 in FIG. 12).

The specific user authentication method to be used is not specifically limited. For example, user authentication can be performed by making the user input a user ID and a password to the user terminal 202, making the user terminal 202 transmit the user ID and the password to the agent 2, and making the agent 2 collate the received user ID and password with user authentication information held in the intra-tenant user DB 21. In addition, for example, it suffices to use biometric information such as a fingerprint of the user or secret information stored in an IC card instead of or in addition to the password. There are various other user authentication methods which can be used.

After authentication succeeds, the user designates (requires), to the agent 2, the virtual point identifier VPID and an operation content (e.g., "ON" or "OFF" operation for the switch of a lighting or changing of the set temperature of an air conditioner. In some case, however, no operation content is required, e.g., when the current set temperature is to be acquired.) (step S83) (see 801 in FIG. 12).

Upon receiving the instruction, the agent 2 causes the virtual point control instruction reception unit 25 to acquire an equipment list, i.e., a set of combinations {GID, EID} of control target equipment identifiers and corresponding gateway identifiers, by referring to the virtual point table (e.g., FIG. 9) on the basis of the user identifier UID and the virtual point identifier VPID (step S84).

The agent 2 further acquires gateway information, i.e., a combination {GID, TID} of a target gateway identifier and a tenant identifier, by referring to the user table (e.g., FIG. 10) on the basis of the user identifier UID (step S85). Note that the above gateway information sometimes contains a plurality of combinations {GID, TID}.

The virtual point control instruction reception unit 25 transfers the acquired equipment list and the designated operation content to the equipment monitoring control remote protocol processing unit 26 (see 802 in FIG. 12).

The agent 2 causes the equipment monitoring control remote protocol processing unit 26 to issue a request to perform authentication of each combination {GID, EID} contained in the equipment list by using the tenant identifier TID defined by the facility side gateway 1 indicated by the target gateway identifier GID (step S86) (see 803 in FIG. 12).

Although an authentication request can be transmitted for each combination {GID, EID}, it is preferable to transmit an authentication request for each gateway identifier GID upon grouping the set of identifiers EID of the set of combinations {GID, EID} for each gateway identifier GID and rearranging the resultant identifiers into a set of combinations {GID, EID}, in order to prevent redundant authentication of the same facility side gateway 1.

Upon receiving the request, the facility side gateway 1 causes the tenant authentication unit 14 to perform tenant authentication on a tenant identifier TID basis (step S87) (see 803 in FIG. 12). In this case, the tenant authentication unit 14 performs tenant authentication by referring to the tenant table (e.g., FIG. 6) on the basis of TID associated with the request. The specific tenant authentication method to be used is not specifically limited.

After authentication succeeds, the equipment monitoring control remote protocol processing unit 26 of the agent 2 creates a remote control command containing an operation command to facility equipment with each identifier EID contained in the equipment list on the basis of the equipment list and operation content transferred from the virtual point control instruction reception unit 25, and transmits the created remote control command to each corresponding facility side gateway 1 (of the equipment monitoring control remote protocol processing unit 15) (step S88) (see 804 in FIG. 12). A remote control command contains, for example, the equipment identifier EID, an operation content, and the tenant identifier TID. In addition to the method of creating a remote control command for each facility equipment, there is available a method of collectively creating a remote control command for all or some of pieces of facility equipment belonging to the same facility side gateway 1. In any case, a plurality of control commands can be created on the basis of operation corresponding to one VP designated by the user.

The agent 2 (of the equipment monitoring control remote protocol processing unit 26) typically communicates with the facility side gateway 1 (of the equipment monitoring control remote protocol processing unit 15) by using XML/SOAP. Although authentication can be implemented by Web Services Security defined by OASIS, this embodiment is not limited to this.

Upon receiving the remote control command, the facility side gateway 1 causes the equipment monitoring control remote protocol processing unit 15 to check whether a tenant (a user belonging to it) associated with the agent 2 as the command transmission source has the right to operate the equipment with the equipment identifier EID as an operation target, by referring to operable equipment lists in the tenant table (e.g., FIG. 6) on the basis of the tenant identifier TID associated with the agent 2 as the command transmission source (step S89).

Upon determining that the facility equipment with the identifier EID can be operated, the equipment monitoring control remote protocol processing unit 15 transfers the remote control command to the equipment monitoring control local protocol processing unit 16 (see 805 in FIG. 12).

Note that if it is determined that the facility equipment with the identifier EID cannot be operated, the control command is discarded. Assume that this system employs an arrangement which allows one control command to contain operation for a plurality of pieces of facility equipment. In this case, there are available a method of totally discarding one control command if there is no right to operate some pieces of facility equipment contained in one control command and a method of discarding only a portion of the control command which is associated with facility equipment which there is no right to operate. If a command is discarded, the facility side gateway 1 preferably returns a notification indicating an error to the agent 2 as the request source.

Upon receiving the remote control command for which the right to operation has been checked, the equipment monitoring control local protocol processing unit 16 transmits a local control command created by protocol conversion from the remote protocol to the local protocol to a controller associated with the corresponding facility equipment (step S90) (see 806 in FIG. 12). Assume that this system employs the arrangement which allows one remote control command to contain operation for a plurality of pieces of facility equipment. In this case, if a received remote control command contains operation for a plurality of pieces of facility equipment, a local control command is created for each facility equipment.

In the above protocol conversion, for example, a command based on the second protocol is created by acquiring actual control object information on the basis of the identifier EID and the operation content. The address of the controller can be obtained by, for example, obtaining the corresponding point identifier PID by referring to the point identifier set in the equipment set table (e.g., FIG. 7) on the basis of the equipment identifier EID, and referring to the point information table (e.g., FIG. 8) on the basis of the point identifier PID. Note that a control object is typically an air conditioner or lighting which can be controlled via a network, and can perform communication by using a control protocol typified by BACnet. However, this embodiment is not limited to this.

The controller of the facility equipment which has received the local control command executes the control command (step S91) (see 806 in FIG. 12).

Note that the controller can notify the facility side gateway 1 of a control result, and the facility side gateway 1 can notify the user terminal 202 of the result via the facility side gateway 1, as needed.

Note that the above communication sequence is an example, and its variations are available.

According to the above description, the user issues a request for control corresponding to a desired virtual point by using the user terminal 202. However, the system can be configured such that specific events are made to correspond to control operations for specific virtual points in the user terminal 202 in advance as needed, and when one of the specific events is detected in the user terminal 202, the terminal 202 automatically issues a request for control for the specific virtual point corresponding to the specific event to the agent 2.

An example of implementing cooperation between an agent and OA equipment will be described next as a concrete example of the facility equipment cooperation system according to this embodiment.

Figure 13:
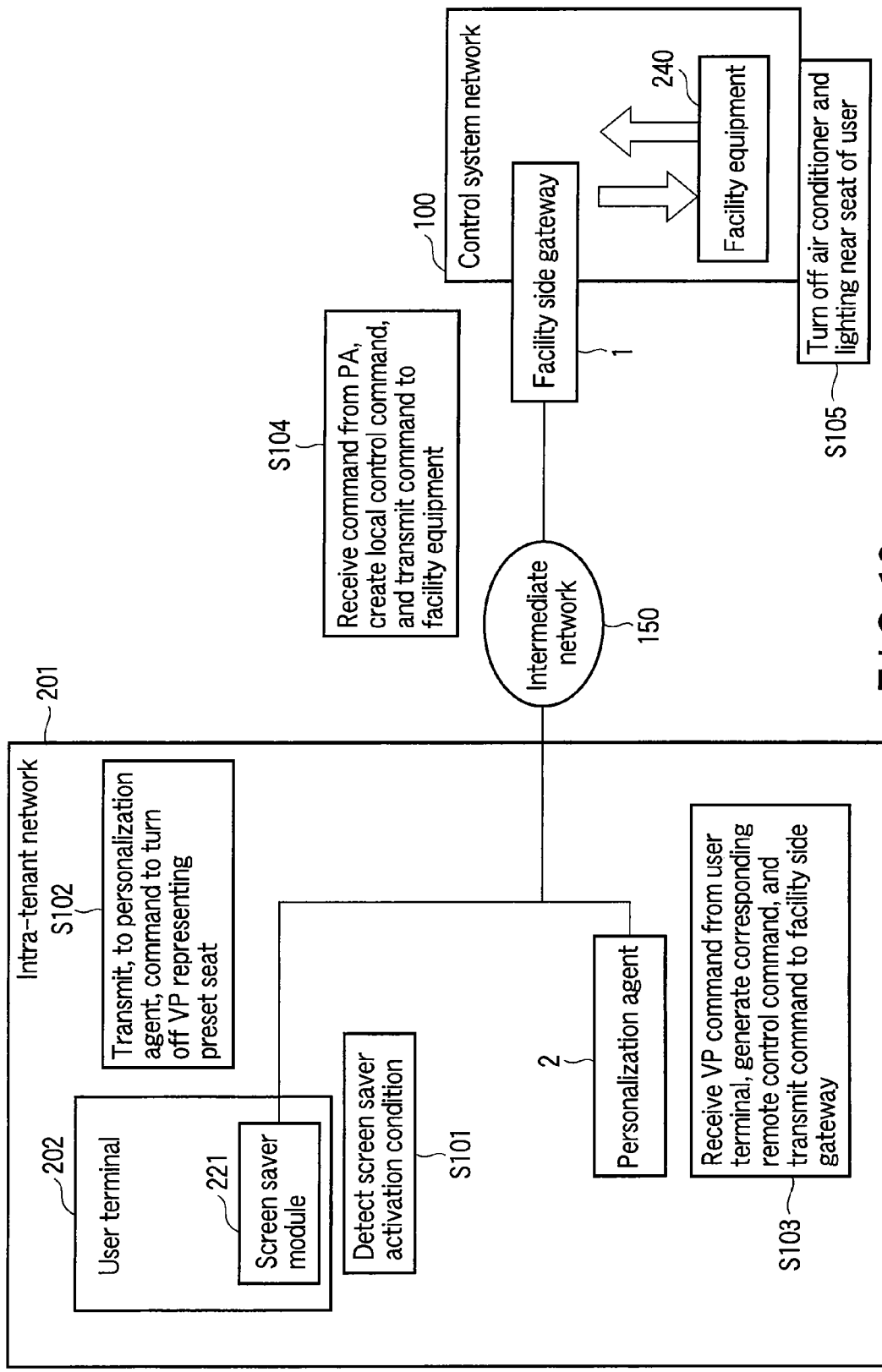
FIG. 13 is a block diagram for explaining an example of cooperation between the personalization agent and OA equipment.

An air conditioner saver/lighting saver which are made to cooperate with screen saver will be described below with reference to FIG. 13.

In this cooperation service, when a PC as the user terminal 202 of each user in a tenant is set in the screen saver mode, a module incorporating screen saver in the PC detects a screen saver activation condition (step S101). When a screen saver activation event occurs, the user terminal 202 transmits, to the agent 2, a request containing the user identifier UID indicating the owner of the PC, the identifier VPID of the virtual point VP targeted at "air conditioner" and "lighting" near the seat of the user as one block, and a command to set the virtual point VP to "OFF" (or "energy save mode") (step S102).

The agent 2 arranges the virtual point VP associated with the received request in each facility equipment ("air conditioner" and "lighting" in this case), converts the OFF command (or the energy saving mode transition command) into a control command based on the remote protocol, and transmits the resultant command to the target facility side gateway 1 (step S103).

Upon receiving the remote control command, the facility side gateway 1 creates a control command based on the local protocol on the basis of the received command and transmits the created command to the target facility equipment (see 240 in FIG. 13) (step S104).

As a consequence, when screen saver is activated in the PC of the user, the air conditioner and the lighting near the seat of the user are simultaneously turned off (step S105).

Obviously, in contrast to the above operation, when an event of restoring from screen saver to a normal window occurs, "air conditioner" and "lighting" near the seat of the user can be simultaneously turned on (or can be restored to the normal mode) by transmitting a remote control command to set the virtual point VP targeted at "air conditioner" and "lighting" as one block to "ON". When an event of turning off the power supply of the PC occurs as the user returns home or goes out, "air conditioner" and "lighting" near the seat of the user can be simultaneously turned off by transmitting a remote control command to set the virtual point VP targeted at "air conditioner" and "lighting" as one block to "OFF". In contrast to this, when an event of turning on the power supply of the PC occurs as the user comes to the office or returns from the outside, "air conditioner" and "lighting" near the seat of the user can be simultaneously turned on by transmitting a remote control command to set the virtual point VP targeted at "air conditioner" and "lighting" as one block to "ON".

Obviously, these processes are an example of cooperating operation, and other variations are available.

Since the agent 2 in this embodiment is a system on the intra-tenant network 201, the user identifier UID indicating the owner of the PC can be easily used from the viewpoint of the operation policy. In addition, since equipment group information of equipment near the seat of the user is managed by the agent 2, each PC need not recognize each equipment. For example, settings required for a screen saver module 221 for each PC can be minimized by performing numbering such that "001" as the virtual point identifier VPID associated with the user identifier UID indicates the seat of the user with the identifier UID. If, for example, the position of the seat is changed due to personnel reshuffle or the like, the user can easily change the setting by his/her own right at this point of time.

A system accompanied with an approval flow associated with the organization of tenants, e.g., an overtime application in a labor management system, will be described next as another concrete example of the facility equipment cooperation system of this embodiment.

In this case, the operation of air conditioning equipment is stopped at a predetermined time such as the closing time of the office. A case in which when an overtime application is approved, the operation of the air conditioning equipment near the seat of the applicant is prolonged will be described.

A system accompanied with an approval flow associated with an organization has already been onlined and various business logics are incorporated in the system. Each application in such a system has a state associated with an approval status, and allows to grasp the approval status of the application in accordance with the state. In such a system, when, for example, the immediate boss approves an overtime application, a request for a prolonging operation instruction for the virtual point VP corresponding to the air conditioning equipment near the seat of the applicant is transmitted in response to the occurrence of this state.

In this case, for example, a labor management system transmits, to the agent 2, a request accompanied with the user identifier UID indicating the applicant, the virtual point identifier VPID indicating the air conditioning equipment near the seat of the applicant, and an instruction to keep the virtual point identifier VPID "ON" in an overtime zone. The subsequent operation of the agent 2 is the same as that described above, and user authentication is performed with the labor management system.

In the above case, with regard to the time by which the operation of the air conditioning equipment is prolonged, when the user submits an overtime application, the application includes the office leaving time, and the request from the labor management system to the agent 2 includes the office leaving time. When the agent 2 creates a control command, the control command includes the preset time when the air conditioning equipment is to be stopped. When the operation of the air conditioning equipment is prolonged once, it suffices to eliminate the necessity to preset any stop time. In this case, the air conditioning equipment can be stopped in conjunction with the power OFF of the PC when the user returns home.

The arrangement in which the intra-tenant user authentication unit 24 is included in the agent 2 has been described so far. However, a single sign-on system can be implemented in cooperation with a unified user authentication system in the tenants and the like. In this case, the mapping of roles corresponding to the respective unified user IDs is managed in each agent 2, and authentication of each operation and management of authentication information are entrusted to the single sign-on system.

Cooperating with the single sign-on system will regard, for example, the timing when a user logs in for the first time in a day as "office arrival time" and make a server which manages single sign-on operation notify the agent 2 within the same tenant network of the account used for the single sign-on operation and an instruction (request) to set the virtual point VP indicating the seat of the user of the account to "ON". The agent 2 deduces the corresponding facility equipment from the virtual point VP corresponding to the seat of the user by searching for the corresponding role, creates a remote control command, and transmits the created remote control command to the facility side gateway 1. This makes it possible to automate a series of facility equipment control operations such as turning on of a lighting, activation of an air conditioner, and energization of power supplies and the like which are required after a user comes to the office in response to first logging on in a day as single sign-on operation.

The above description is based on the assumption that a user in a tenant is regarded as a user of building facilities. However, users of facility equipment can be outsiders such as visitors to tenants, sanitation workers, maintenance workers, and security guards.

When, for example, a user in a tenant is to handle an outsider, it suffices to perform operation in accordance with an outside policy in the tenant in the form of managing a temporal account for visitors in the agent 2 and handing the account to the outside user.

The building owner sometimes makes a contract with a person outside a tenant (e.g., a sanitation worker or maintenance worker). In this case, for example, the facility side gateway 1 can issue an account upon regarding a birefringence management service as one tenant, and the building management side can manage operable equipment lists for the respective workers.

As described above, according to this embodiment, it is possible to easily cooperate with intra-tenant business systems by managing only tenant information on the facility side gateway 1 side and managing user information on the agent 2 side. In addition, the function of the virtual point VP freely and integrally expressing facility equipment within a permitted range (integrating VP management in the agent 2) can save the labor of managing/grasping each equipment on the business system side. Furthermore, since the facility side gateway 1 is in charge of actually issuing operation instructions to facility equipment, the facility side gateway 1 can prohibit control by overriding in accordance with a policy on the facility side gateway 1 side.

Customization of the virtual point VP by each user will be described next.

Figure 14:
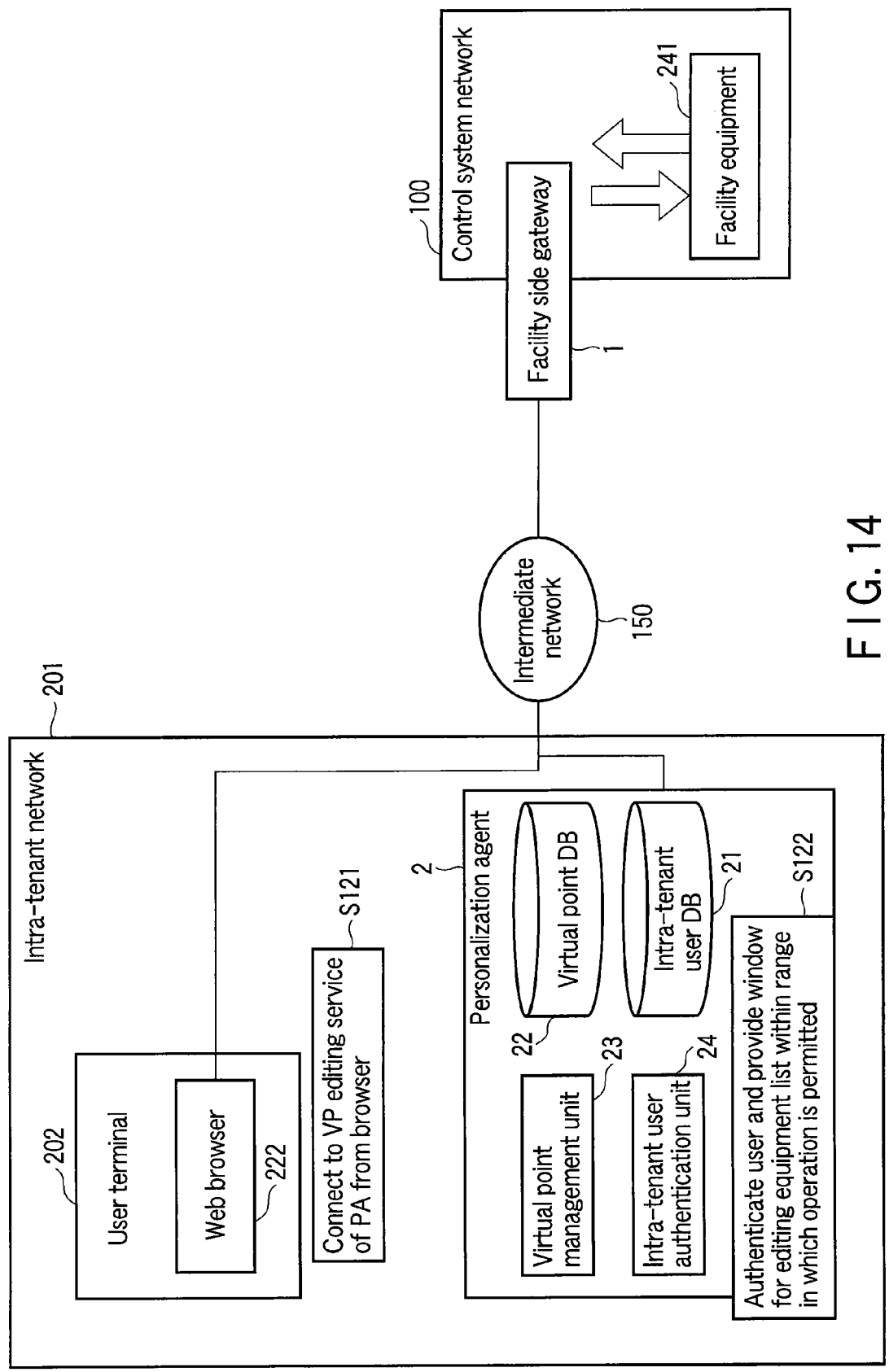
FIG. 14 is a block diagram for explaining an example of editing a virtual point identifier VPID.

An example of editing the virtual point identifier VPID will be described below with reference to FIG. 14.

As described above, a description stating which facility the agent 2 is to operate includes the equipment identifier EID of target facility equipment (see 241 in FIG. 14), and the identifier, i.e., the gateway identifier GID, of the facility side gateway 1 connected to the control system network 100 to which the facility equipment is connected. That is, customizing the virtual point VP of the user is equivalent to giving a set of pairs of the gateway identifiers GID and the equipment identifiers EID to the identifier of the virtual point VP, i.e., the virtual point identifier VPID.

The equipment information providing unit 13 of each facility side gateway 1 provides the agent 2 with a set of equipment identifiers EID of pieces of facility equipment belonging to the facility side gateway 1. The equipment information may be information corresponding to equipment managed on the facility side one to one or may be information corresponding to group equipment including several pieces of equipment regarded as one piece of equipment. Information containing at least information (RW) representing that equipment settings can be read and written, information (RO) representing read-only operation, and information (X) representing operation prohibition (note that it is also possible to use a method of not explicitly describing information (X) representing operation prohibition) is provided, to the agent 2 side, as access control information corresponding to the tenant identifier TID of a tenant associated with the agent 2. This allows the agent 2 side to acquire a list of pieces of operable equipment.

In the agent 2, a means for giving a set of identifiers EID to a given virtual point identifier VPID can be implemented by, for example, connecting to a VP editing service provided by the agent 2 from a Web browser 222 of the user terminal 202 (S121) and providing a Web window for VPID editing in the agent 2 (S122). Note that VPID editing operation is lower in frequency than VPID operation, and is not a very heavy function. This VPID editing window may be configured to allow a user in a tenant to freely combine pieces of equipment in the range permitted for the agent 2 by the facility side gateway 1. Alternatively, it suffices to make the agent 2 implement additional access control based on the division to which a user belongs, allow an authorized person to operate the access control, and permit a general user to only freely combine pieces of equipment within the permitted range in the tenant. Obviously, various methods for access control are available.

Note that a user can perform user authentication before the above editing operation.

In addition, as described above, in operation corresponding to the virtual point VP, an actual set value may be based on the type of control command or a user may be allowed to designate a specific value as a set value. It is preferable to allow the agent 2 side to separately set such a command.

Figure 15:
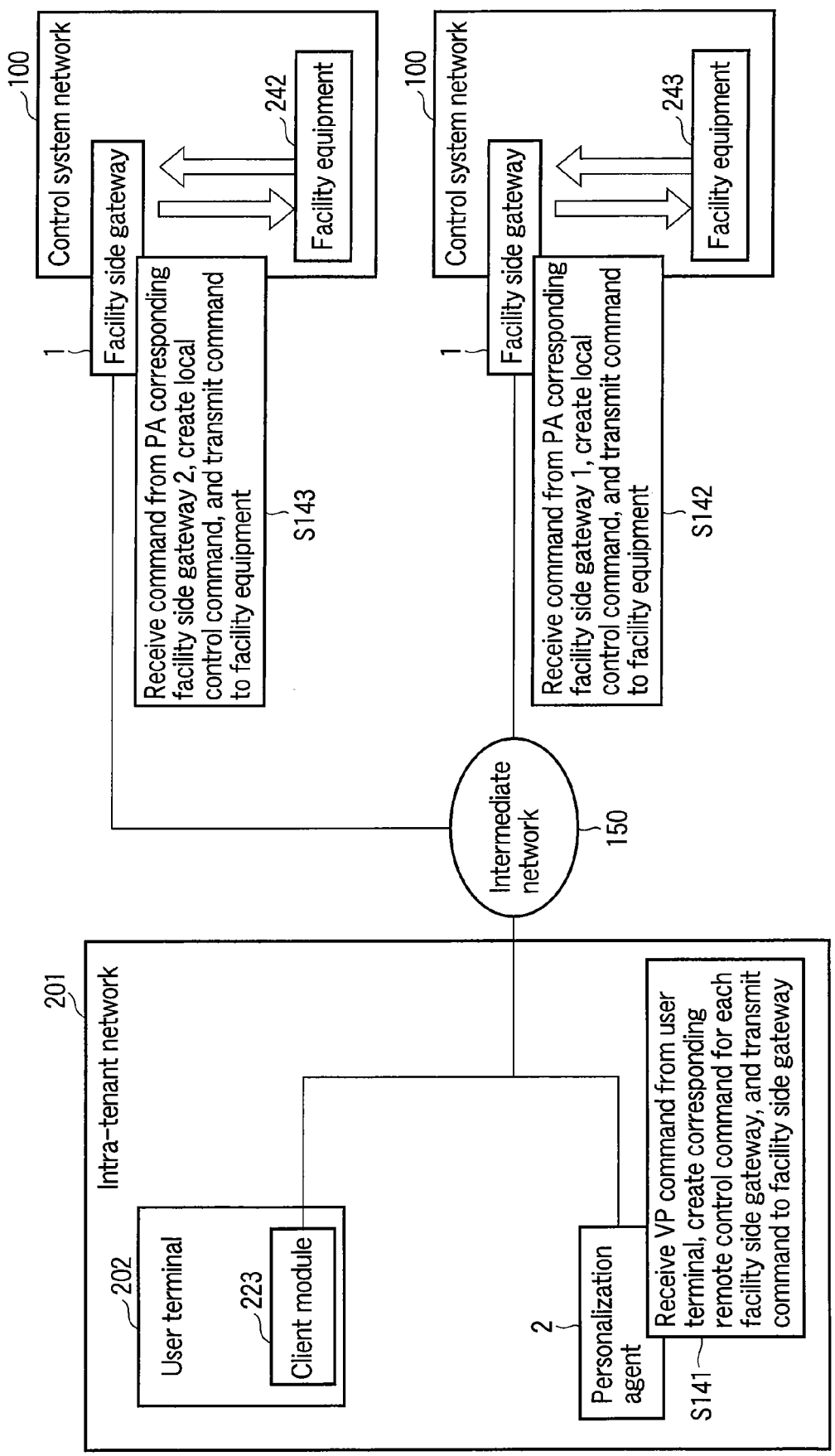
FIG. 15 is a block diagram for explaining an example including a plurality of facility side gateways.

A case in which there are a plurality of facility side gateways 1 will be described next with reference to FIG. 15.

The case in which there is only one facility side gateway 1 has been mainly described above. As described above, however, this embodiment can also be applied to an arrangement in which there are a plurality of facility side gateways 1.

A case in which there are a plurality of facility side gateways 1 includes, for example, a case in which tenants are physically scattered in a plurality of buildings or a case in which the agent 2 transmits a remote control command to a plurality of facility side gateways 1 because, for example, the facility side gateways 1 are installed for the respective floors.

In this case, for example, the user table shown in FIG. 10 may store in advance, as gateway information, combinations of the gateway identifiers GID and the tenant identifiers TID managed by the facility side gateways 1 corresponding to the gateway identifiers GID by amount corresponding to the number of facility side gateways 1 which the agent 2 is to access.

Assume that the agent 2 has received a request for operation corresponding to a virtual point from the user terminal 202 (e.g., a client module 223 in the user terminal 202), and the target facility equipment belongs to a plurality of facility side gateways 1. In this case, the agent 2 performs authentication for each facility side gateway 1 by using the corresponding gateway identifier GID and the tenant identifier TID, and transmits a remote control command to each facility side gateway 1 (S141). Each facility side gateway 1 performs monitoring control on the corresponding facility equipment (see 242 and 243 in FIG. 15) on the basis of the received control command (S142 and S143).

In this case, the tenant identifiers TID need not be uniquely assigned to all the facility side gateways 1, but it suffices if the tenant identifier TID is unique within each facility side gateway 1. This eliminates the necessity to assignment management of the tenant identifiers TID between the facility side gateways 1. For this reason, even in an operation form in which different managers exist for the respective facility side gateways 1, the management cost does not increase.

Figure 16:
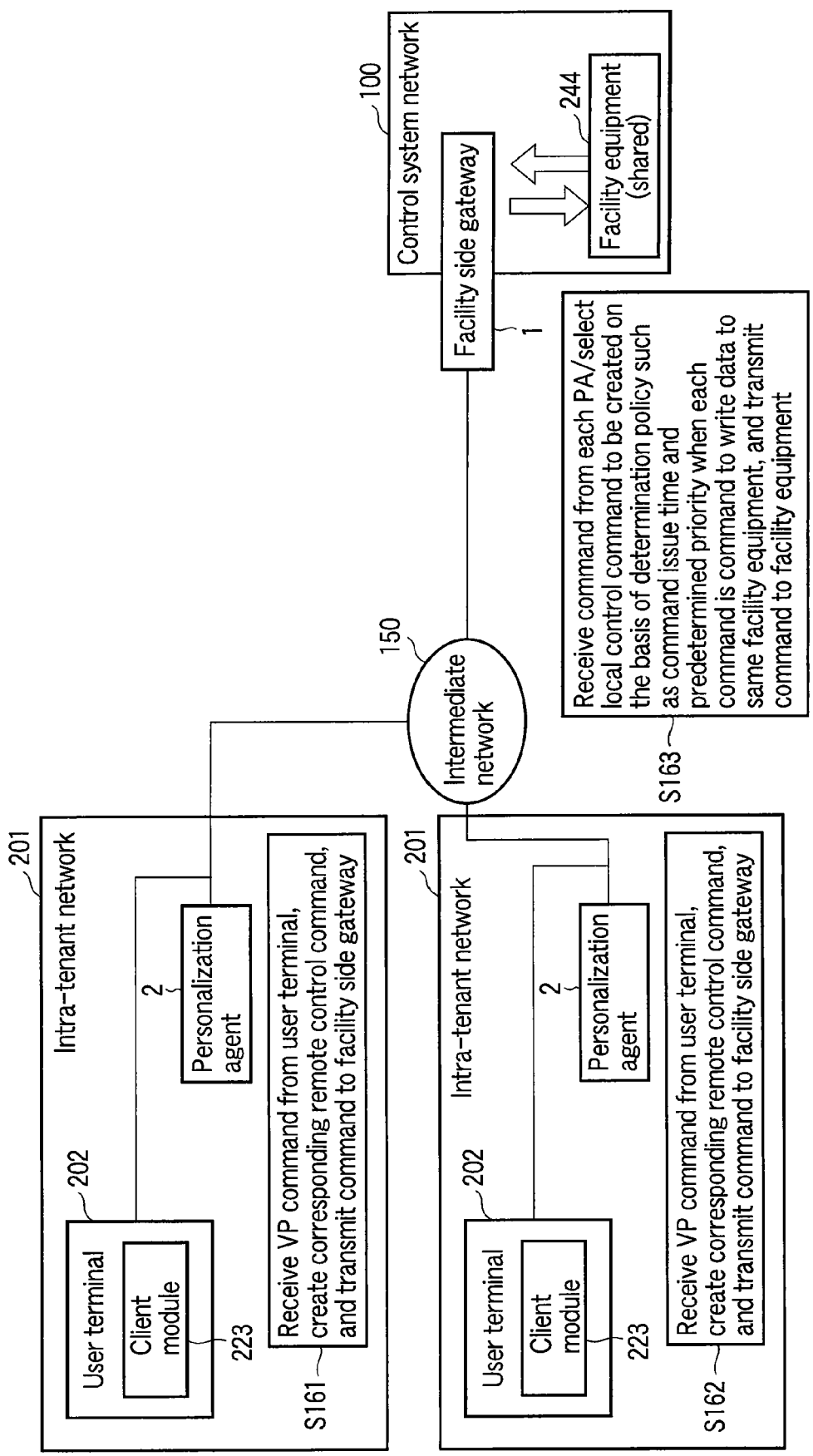
FIG. 16 is a block diagram for explaining an example of cooperation between a plurality of personalization agents and shared facility equipment.
Figure 17:
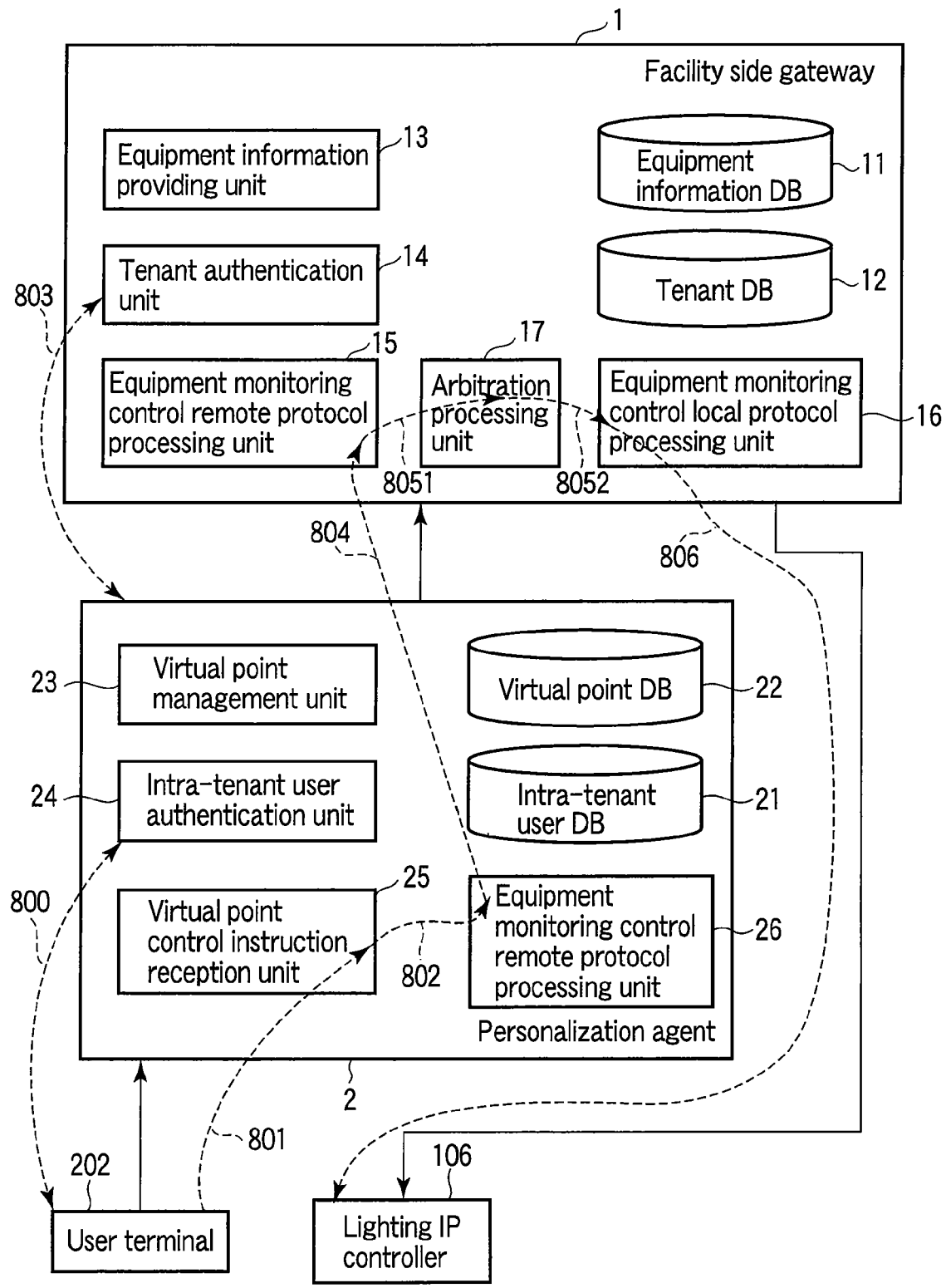
FIG. 17 is a block diagram showing an example of an arrangement in which an arbitration processing unit is added to the facility side gateway in FIG. 3.

An example of cooperation between a plurality of agents and shared facility equipment will be described next with reference to FIGS. 16 and 17. FIG. 17 shows an example of an arrangement in which an arbitration processing unit 17 is added to the facility side gateway 1 in FIG. 3.

Consider, for example, a use case in which elevator stop floor operation or the like is performed from inside a tenant. In this case, the elevator is shared facility in the building, and hence may be simultaneously accessed by a plurality of users in a plurality of tenants or a plurality of users in the same tenant.

As described above, each tenant can directly monitor and control facility equipment via the network in the tenant by using the agent 2 and the facility side gateway 1. Assume that a plurality of tenants resident in one building perform monitoring and control on shared facility for elevator stop floor operation, lighting and air conditioning on a pathway, the condition of an automatic door at the entrance, and the like via the same facility side gateway 1, and that each tenant can monitor and control arbitrary facility equipment at an arbitrary timing. In this case, there is a possibility that a plurality of tenants may simultaneously monitor and control the same facility equipment.

Assume that a plurality of agents 2 have transmitted remote control commands to shared facility equipment (see 244 in FIG. 16) at the same time (or at different timings within a predetermined period of time) (S161 and S162), and the same facility side gateway 1 has received the commands. In this case, if no problem arises when these control commands are simultaneously executed, the facility side gateway 1 simultaneously executes them. Otherwise, the facility side gateway 1 performs arbitration processing for these control commands on the basis of a predetermined criterion (S163).

Note that it suffices to perform this arbitration processing in the arbitration processing unit 17 provided between the equipment monitoring control remote protocol processing unit 15 and the equipment monitoring control local protocol processing unit 16 (see 8051 and 8052 in FIG. 17).

A case in which there is no need to perform arbitration includes, for example, a case in which the facility side gateway 1 has received remote control commands for only reading the operation state of shared facility equipment, and the current value of a sensor. In this case, it suffices to permit simultaneous access and provide each agent 2 with a desired value. Note that in this case, it suffices to execute a control command for each request source or perform read operation upon executing only one of the commands and use the result.

In contrast to this, if, for example, the facility side gateway 1 has received a remote control command for directly operating facility equipment, e.g., turning on/off a switch, or a plurality of remote control commands for writing some data in facility equipment, e.g., changing settings, arbitration is sometimes required. If, for example, the facility side gateway 1 has received a plurality of contradictory control commands for the same facility equipment (e.g., a control command for turning on a switch and a control command for turning off the switch, or a control command for raising the temperature and a control command for lowering the temperature) or a plurality of commands which generate an unexpected result upon being simultaneously executed (e.g., a command for raising the set temperature by 2° and a control command for raising the temperature by 3°), or a plurality of commands which produce different results depending on the order of execution (e.g., a command for setting the set temperature to 23° and a command for setting the set temperature to 24°), it suffices to execute arbitration.

As an arbitration method, there is available a method of selecting one of a plurality of received remote control commands and discarding the remaining commands. More specifically, there is available a method in which a remote control command (local control command to be created) is selected on the basis of a predetermined criterion such as a command issue time, a command reception time, or the priority of the tenant identifier TID which is determined in advance, a local control command is created on the basis of the remote control command, and the local control command is transmitted to the facility equipment. There is also available a method like a queuing method of determining the priorities of a plurality of control commands and sequentially issuing the plurality of control commands.

To the agent 2 which has received no command as a result of such arbitration, it is preferable to return an error message indicating the corresponding information.

A facility in a shared portion is sometime monitored and controlled by not only the agent 2 in each tenant but also the agent 2 of the building manager which manages the overall building. For example, the agent 2 of the building manager monitors the operation state of the lightings and the air conditioners in the entire building or the state of anti-crime/anti-disaster facilities. When the operation states of all pieces of equipment on a given floor become OFF, the agent 2 detects that there is no user, and can issue a command to turn off the pieces of equipment in the shared portion on the floor.

According to this embodiment, on the building automation system side, it suffices to perform only tenant management concerning which tenant has the right to operate which facility equipment and to entrust each user management in each tenant to the agent. The agent side can use the existing user authentication mechanism in each tenant.

According to this embodiment, a user can freely customize the settings of equipment within the range permitted by the facility side gateway.

In addition, according to this embodiment, an agent is separated from the building automation system, and hence does not easily receive restrictions of the building automation system. Functions directly connected to the building automation system, such as the protocol conversion function, are installed in the facility side gateway but are not directly connected to the network in each tenant. Therefore, such functions do not easily receive restrictions of the tenant side operation policy.

Furthermore, according to this embodiment, the task of actually issuing operation instructions to facility equipment is assigned to the facility side gateway, and hence overriding with the policy on the facility side gateway side can prohibit control.

Note that each function described above can also be implemented by describing it as software and making a computer having a proper mechanism process it.

In addition, this embodiment can be implemented as a program for causing a computer to execute a predetermined sequence, causing the computer to function as predetermined means, or causing the computer to implement predetermined functions. In addition, the embodiment can be implemented as a computer-readable recording medium on which the program is recorded.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A facility equipment cooperation system including a gateway apparatus connecting to a plurality of pieces of facility equipment in a building via a control system network, and an agent apparatus installed for each of a plurality of tenants in the building, each agent apparatus communicating with the gateway apparatus via an information system network other than the control system network, the agent apparatus comprising:
a storage unit configured to store not less than one piece of virtual point information defining a virtual point combined with not less than one piece of facility equipment as an operation target;
a user authentication unit configured to perform user authentication for a user associated with a client apparatus;
a request reception unit configured to receive a request for control on any of the virtual points from the client apparatus;
a first command creation unit configured to create a remote control command based on a specific remote protocol for the facility equipment associated with the request based on the virtual point information associated with the request when the request has been received from the client apparatus and the user authentication associated with the client apparatus has succeeded; and
a first command transmission unit configured to transmit the remote control command to the gateway apparatus via the information system network when tenant authentication for a tenant associated with the agent apparatus which is performed by the gateway apparatus has succeeded, and the gateway apparatus comprising:
a tenant authentication unit configured to perform the tenant authentication associated with the agent apparatus;
a command reception unit configured to receive the remote control command from the agent apparatus via the information system;
a second command creation unit configured to create a local control command based on a specific local protocol for the facility equipment associated with the remote control command based on the remote control command when the remote control command has been received from the agent apparatus and the tenant authentication associated with the agent apparatus has succeeded; and
a second command transmission unit configured to transmit the created local control command to the facility equipment or a controller of the facility equipment associated with the local control command via the control system network.

2. The system according to claim 1, wherein the first command creation unit creates the remote control command only when the tenant authentication associated with the agent apparatus has succeeded in a case in which the request has been received from the client apparatus and the user authentication associated with the client apparatus has succeeded.

3. The system according to claim 1, wherein
the storage unit stores the virtual point information in correspondence with each user, and
the agent apparatus further comprises a reception unit configured to receive, from the client apparatus, editing operation including one or more of addition, modification, and deletion for the virtual point information corresponding to a specific user.

4. The system according to claim 1, wherein
the storage unit stores the virtual point information in correspondence with each user, and
the client apparatus requests the agent apparatus to perform the user authentication, receives, from the user, an instruction to select one of the virtual points associated with the user which is a control target after the user authentication has succeeded, and transmits, to the agent apparatus, a request for control on the virtual point associated with the received instruction.

5. The system according to claim 1, wherein when a specific event is detected, the client apparatus automatically transmits a request for control on a specific virtual point corresponding to the specific event to the agent apparatus.

6. The system according to claim 1, wherein
each of the virtual points includes, for not less than one piece of facility equipment associated with the virtual point, a combination of an equipment identifier identifying the facility equipment and a gateway identifier identifying the gateway apparatus corresponding to the facility equipment, and
the first command creation unit creates the remote control command for at least each gateway identifier when the virtual point information associated with the request includes a plurality of different equipment identifiers and a plurality of different gateway identifiers.

7. The system according to claim 1, wherein
the gateway apparatus further comprises a list information storage unit configured to store, for each of the plurality of tenants, list information of equipment identifiers identifying not less than one piece of facility equipment for which control by a user associated with the tenant is permitted, and
the second command creation unit creates the local control command for the facility equipment only when the list information is referred to based on an equipment identifier of the facility equipment associated with the remote control command and control on the facility equipment is permitted.

8. The system according to claim 1, wherein the gateway apparatus further comprises an arbitration processing unit configured to perform arbitration processing conforming to a predetermined criterion upon receiving a plurality of remote control commands for the same facility equipment at the same time or different timings within a predetermined period of time.

9. The system according to claim 1, wherein the gateway apparatus further comprises a providing unit configured to provide each of the agent apparatuses with information concerning facility equipment configured to be controlled by the agent via the gateway apparatus.

10. The system according to claim 1, wherein the user authentication unit performs the user authentication in conjunction with an external single sign-on system.

11. An agent apparatus for installation at each of a plurality of tenants in a building, each agent apparatus communicating with a gateway apparatus via an information system network other than a control system network over which the gateway apparatus connects to a plurality of pieces of facility equipment in the building, the agent apparatus comprising:
a storage unit configured to store not less than one piece of virtual point information defining a virtual point combined with not less than one piece of facility equipment as an operation target;
a user authentication unit configured to perform user authentication for a user associated with a client apparatus;

a request reception unit configured to receive a request for control on any of the virtual points from the client apparatus;

a command creation unit configured to create a remote control command based on a specific remote protocol for the facility equipment associated with the request based on the virtual point information associated with the request when the request has been received from the client apparatus and the user authentication associated with the client apparatus has succeeded; and a command transmission unit configured to transmit the remote control command to the gateway apparatus via the information system network when tenant authentication for a tenant associated with the agent apparatus which is performed by the gateway apparatus has succeeded.

12. The apparatus according to claim 11, wherein the command creation unit creates the remote control command only when the tenant authentication associated with the agent apparatus has succeeded in a case in which the request has been received from the client apparatus and the user authentication associated with the client apparatus has succeeded.

13. The apparatus according to claim 11, wherein
the storage unit stores the virtual point information in correspondence with each user, and
the agent apparatus further comprises a reception unit configured to receive, from the client apparatus, editing operation including one or more of addition, modification, and deletion for the virtual point information corresponding to a specific user.

14. The apparatus according to claim 11, wherein
the storage unit stores the virtual point information in correspondence with each user, and
the client apparatus requests the agent apparatus to perform the user authentication, receives, from the user, an instruction to select one of the virtual points associated with the user which is a control target after the user authentication has succeeded, and transmits, to the agent apparatus, a request for control on the virtual point associated with the received instruction.

15. The apparatus according to claim 11, wherein when a specific event is detected, the client apparatus automatically transmits a request for control on a specific virtual point corresponding to the specific event to the agent apparatus.

16. The apparatus according to claim 11, wherein
each of the virtual points includes, for not less than one piece of facility equipment associated with the virtual point, a combination of an equipment identifier identifying the facility equipment and a gateway identifier identifying the gateway apparatus corresponding to the facility equipment, and
the command creation unit creates the remote control command for at least each gateway identifier when the virtual point information associated with the request includes a plurality of different equipment identifiers and a plurality of different gateway identifiers.

17. The apparatus according to claim 11, wherein the user authentication unit performs the user authentication in conjunction with an external single sign-on system.

18. An equipment control method for a facility equipment cooperation system including a gateway apparatus connecting to a plurality of pieces of facility equipment in a building via control system network, and an agent apparatus installed for each of a plurality of tenants in the building, each agent apparatus communicating with the gateway apparatus via an information system network other than the control system network, the method comprising:

storing, in the agent apparatus, not less than one piece of virtual point information defining a virtual point combined with not less than one piece of facility equipment as an operation target;

performing, in the agent apparatus, user authentication for a user associated with a client apparatus;

receiving, in the agent apparatus, a request for control on any of the virtual points from the client apparatus;

creating, in the agent apparatus, a remote control command based on a specific remote protocol for the facility equipment associated with the request based on the virtual point information associated with the request when the request has been received from the client apparatus and the user authentication associated with the client apparatus has succeeded;

performing, in the gateway apparatus, the tenant authentication for the tenant associated with the agent apparatus;

transmitting, in the agent apparatus, the remote control command to the gateway apparatus via the information system network when the tenant authentication for the tenant has succeeded;

receiving, in the gateway apparatus, the remote control command from the agent apparatus via the information system network;

creating, in the gateway apparatus, a local control command based on a specific local protocol for the facility equipment associated with the remote control command based on the remote control command when the remote control command has been received from the agent apparatus and the tenant authentication associated with the agent apparatus has succeeded; and transmitting, in the gateway apparatus, the created local control command to the facility equipment or a controller of the facility equipment associated with the local control command via the control system network.

19. An equipment control method for a facility equipment cooperation system including a gateway apparatus connecting to a plurality of pieces of facility equipment in a building via a control system network, and an agent apparatus installed for each of a plurality of tenants in the building, each agent apparatus communicating with the gateway apparatus via an information system network other than the control system network, the method comprising:

storing, in the agent apparatus, not less than one piece of virtual point information defining a virtual point combined with not less than one piece of facility equipment as an operation target;

performing, in the agent apparatus, user authentication for a user associated with a client apparatus;

performing, in the gateway apparatus, the tenant authentication for the tenant associated with the agent apparatus;

receiving, in the agent apparatus, a request for control on any of the virtual points from the client apparatus;

creating, in the agent apparatus, a remote control command based on a specific remote protocol for the facility equipment associated with the request based on the virtual point information associated with the request when the request has been received from the client apparatus and both the user authentication associated with the client apparatus and the tenant authentication associated with the agent apparatus have succeeded;

transmitting, in the agent apparatus, the remote control command to the gateway apparatus via the information system network when the tenant authentication for the tenant has succeeded;

receiving, in the gateway apparatus, the remote control command from the agent apparatus via the information system network;

creating, in the gateway apparatus, a local control command based on a specific local protocol for the facility equipment associated with the remote control command based on the remote control command when the remote control command has been received from the agent apparatus and the tenant authentication associated with the agent apparatus has succeeded; and transmitting, in the gateway apparatus, the created local control command to the facility equipment or a controller of the facility equipment associated with the local control command via the control system network.

* * * * *